US011910487B2

(12) United States Patent
Kim et al.

(10) Patent No.: US 11,910,487 B2
(45) Date of Patent: Feb. 20, 2024

(54) METHOD AND APPARATUS FOR MONITORING CONTROL INFORMATION IN WIRELESS COMMUNICATION SYSTEM

(71) Applicant: Samsung Electronics Co., Ltd., Gyeonggi-do (KR)

(72) Inventors: Taehyoung Kim, Gyeonggi-do (KR); Jinkyu Kang, Gyeonggi-do (KR); Youngbum Kim, Gyeonggi-do (KR); Seunghoon Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/707,039

(22) Filed: Mar. 29, 2022

(65) Prior Publication Data

US 2022/0217813 A1 Jul. 7, 2022

Related U.S. Application Data

(63) Continuation of application No. 16/838,741, filed on Apr. 2, 2020, now Pat. No. 11,297,684.

(30) Foreign Application Priority Data

Apr. 3, 2019 (KR) ........................ 10-2019-0038888

(51) Int. Cl.
*H04W 72/04* (2023.01)
*H04W 80/08* (2009.01)
*H04L 5/00* (2006.01)
*H04W 72/0446* (2023.01)
(Continued)

(52) U.S. Cl.
CPC .......... *H04W 80/08* (2013.01); *H04L 5/0092* (2013.01); *H04W 24/08* (2013.01); *H04W 72/0446* (2013.01); *H04W 72/23* (2023.01)

(58) Field of Classification Search
CPC . H04W 52/0229; H04W 80/08; H04W 24/08; H04W 72/23; H04W 72/0453; H04W 72/0446; H04W 72/042; H04W 72/1263; H04W 52/022; H04L 5/0092; H04L 5/009
See application file for complete search history.

(56) References Cited

U.S. PATENT DOCUMENTS

2013/0294318 A1* 11/2013 Amerga ................. H04W 4/06
370/312
2018/0278395 A1 9/2018 Yoon
2020/0112411 A1 4/2020 Khoshnevisan
(Continued)

FOREIGN PATENT DOCUMENTS

WO WO 2019/035701 2/2019

*Primary Examiner* — Wei Zhao
(74) *Attorney, Agent, or Firm* — The Farrell Law Firm, P.C.

(57) ABSTRACT

Disclosed is a method performed by a terminal in a wireless communication system, including receiving, from a base station, at least one parameter for a search space, monitoring, on the search space, downlink control information (DCI) related with power saving, the search space being identified based on the at least one parameter, and the DCI including a wake up signal indicating whether to monitor a physical downlink control channel (PDCCH) and a bandwidth part (BWP) indication related with the wake up signal, and performing a PDCCH monitoring based on the wake up signal and the BWP indication included in the DCI.

20 Claims, 11 Drawing Sheets

(51) Int. Cl.
    *H04W 24/08*     (2009.01)
    *H04W 72/23*     (2023.01)

(56) References Cited

U.S. PATENT DOCUMENTS

| | | |
|---|---|---|
| 2020/0374960 A1 | 11/2020 | Deenoo |
| 2021/0045105 A1* | 2/2021 | Yoon .................... H04L 1/1812 |
| 2021/0051759 A1* | 2/2021 | Zhou ................. H04W 52/0229 |
| 2021/0204214 A1* | 7/2021 | Chang ............... H04W 52/0229 |

* cited by examiner

METHOD AND APPARATUS FOR MONITORING CONTROL INFORMATION IN WIRELESS COMMUNICATION SYSTEM

CROSS-REFERENCE TO RELATED APPLICATIONS

This application is a Continuation Application of U.S. patent application Ser. No. 16/838,741, filed on Apr. 2, 2020, and is based on and claims priority under 35 U.S.C. § 119 to Korean Patent Application No. 10-2019-0038888, filed on Apr. 3, 2019, in the Korean Intellectual Property Office, the disclosure of each of which is incorporated by reference herein in its entirety.

BACKGROUND

1. Field

The disclosure relates generally to a wireless communication system, and more particularly, to a method and apparatus for monitoring control information in a wireless communication system.

2. Description of Related Art

In order to meet the increasing demand with respect to wireless data traffic after the commercialization of $4^{th}$ generation (4G) communication systems, efforts have been made to develop improved $5^{th}$ generation (5G) communication systems or pre-5G communication systems, which are also referred to as beyond 4G network communication systems or post long term evolution (LTE) systems.

In order to achieve a high data rate, consideration is given to implementing 5G communication systems in millimeter wave (mmW) frequency bands (e.g., 60 gigahertz (GHz) bands). In order to reduce propagation path loss and increase a propagation distance in millimeter wave frequency bands, in 5G communication systems, efforts have been made to develop technologies such as beamforming, massive multiple-input multiple-output (MIMO), full dimensional MIMO (FD-MIMO), array antenna, analog beamforming, and large scale antenna. In order to improve networks of systems, in 5G communication systems, efforts have been made to develop technologies such as evolved small cell, advanced small cell, cloud radio access network (cloud RAN), ultra-dense network, device-to-device communication (D2D), wireless backhaul, moving network, cooperative communication, coordinated multi-points (CoMP), and interference cancellation. In 5G communication systems, efforts have been made to develop an advanced coding modulation (ACM) scheme such as hybrid frequency-shift keying (FSK) and quadrature amplitude modulation (QAM) modulation (FQAM) or sliding window superposition coding (SWSC) and an enhanced network access scheme such as filter bank multi carrier (FBMC), non-orthogonal multiple access (NOMA), or sparse code multiple access (SCMA).

The Internet is evolving to an Internet of things (IoT) network through which distributed elements such as objects exchange and process information. Internet of everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as a sensor network, machine to machine (M2M) communication, or machine-type communication (MTC), has recently been studied. In an IoT environment, intelligent Internet technology services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Various attempts have been made to apply 5G communication systems to IoT networks. For example, technology such as sensor network, M2M communication, or MTC is implemented by 5G communication technology such as beamforming, MIMO, or array antenna. The application of a cloud RAN as big data processing technology may also be considered as an example of convergence of 5G technology and IoT technology.

Wireless communication systems have been developed from wireless communication systems providing voice centered services to broadband wireless communication systems providing high-speed, high-quality packet data services, such as communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, and 802.16e of Institute of Electrical and Electronics Engineers (IEEE).

An LTE system that is a representative example of the broadband wireless communication system has adopted an orthogonal frequency division multiplexing (OFDM) scheme in a DL and has adopted a single carrier frequency division multiple access (SC-FDMA) scheme in the UL, which refers to a wireless link through which a terminal, a UE, or an MS transmits data or a control signal to the BS or an eNode B. The DL refers to a wireless link through which a base station transmits data or a control signal to a terminal. The multiple access scheme as described above normally allocates and operates time-frequency resources including data or control information to be transmitted according to each user so as to prevent the time-frequency resources from overlapping with each other, that is, to establish orthogonality for distinguishing the data or the control information of each user.

As a future communication system after the LTE system, that is, a 5G communication system has to be able to freely reflect various requirements of a user and a service provider, and thus services satisfying various requirements at the same time need to be supported. The services considered for the 5G communication system include enhanced mobile broadband (EMBB), massive machine-type communication (MMTC), ultra-reliability low latency communication (URLLC), etc.

EMBB aims to provide a higher data transfer rate than a data transfer rate supported by the LTE, LTE-A, or LTE-Pro. For example, in the 5G communication system, EMBB should be able to provide a peak data rate of 20 gigabits per second (Gbps) in the DL and a peak data rate of 10 Gbps in the UL from the viewpoint of one base station. In addition, the 5G communication system should provide the increased user perceived data rate of the terminal simultaneously with providing the peak data rate. In order to satisfy such requirements, improvement of various transmitting/receiving technologies including a further improved MIMO transmission technology is needed. In addition, signals are transmitted using a transmission bandwidth of up to 20 MHz in a 2 GHz band used by the LTE, but the 5G communication system uses a bandwidth wider than 20 MHz in a frequency band of 3 to 6 GHz or more than 6 GHz, thereby satisfying a data transmission rate required in the 5G communication system.

MMTC is being considered to support application services such as IoT in the 5G communication system. MMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km$^2$) in a cell because it is attached to various sensors and devices to provide communication functions. In addition, because the terminals supporting MMTC are more likely to be positioned in shaded areas not covered by a cell, such as an underground of a building due to nature of services, the terminals require a wider coverage than other services provided by the 5G communication system. The terminals that support MMTC should be configured as inexpensive terminals and require very long battery life time, such as 10 to 15 years, because it is difficult to frequently replace batteries of the terminals.

URLLC is a cellular-based wireless communication service used for mission-critical purposes. For example, URLLC may be used in remote control for robots or machinery, industrial automation, unmanned aerial vehicles, remote health care, or emergency alert. Accordingly, communication provided by URLLC should provide very low latency and very high reliability. For example, URLLC-supportive services need to meet an air interface latency of less than 0.5 milliseconds simultaneously with a packet error rate of 10-5 or less. Accordingly, for URLLC-supportive services, the 5G system may be required to provide a transmit time interval (TTI) shorter than those for other services while securing reliable communication links by allocating a broad resource in a frequency band.

The three services, i.e., EMBB, URLLC, and MMTC, considered in the above 5G communication system may be multiplexed in one system and may be transmitted. In this case, the services may use different transmission/reception methods and transmission/reception parameters in order to meet their different requirements. However, 5G is not limited to the above three services.

Because wireless communication systems may provide various services due to the development of the wireless communication systems, there is a need in the art for methods of smoothly providing such services. For example, there is a need for methods of monitoring control information in wireless communication systems. Specifically, 5G mobile communication devices have experienced excessive power consumption, thereby causing an unnecessary use of resources and inconvenience to users.

Accordingly, there is a need in the art for reduced power consumption of a terminal in a next generation mobile communication system.

SUMMARY

Aspects of the disclosure are to address at least the above-mentioned problems and/or disadvantages and to provide at least the advantages described below.

Accordingly, an aspect of the disclosure is to provide an apparatus and method for effectively providing a service in a wireless communication system.

Another aspect of the disclosure is to provide a method and apparatus for reduced power consumption of a terminal in a next generation mobile communication system.

In accordance with an aspect of the disclosure, a method performed by a terminal in a wireless communication system includes receiving, from a base station, at least one parameter for a search space, monitoring, on the search space, downlink control information (DCI) related with power saving, the search space being identified based on the at least one parameter, and the DCI including a wake up signal indicating whether to monitor a physical downlink control channel (PDCCH) and a bandwidth part (BWP) indication related with the wake up signal, and performing a PDCCH monitoring based on the wake up signal and the BWP indication included in the DCI.

In accordance with another aspect of the disclosure, a method performed by a base station in a wireless communication system includes transmitting, to a terminal, at least one parameter for a search space, and transmitting, on the search space, DCI related with power saving, the search space being identified based on the at least one parameter, and the DCI including a wake up signal indicating whether to monitor a PDCCH and a BWP indication related with the wake up signal, wherein a PDCCH monitoring is performed at the terminal based on the wake up signal and the BWP indication included in the DCI.

In accordance with another aspect of the disclosure, a terminal in a wireless communication system includes a transceiver; and a processor coupled with the transceiver and configured to receive, from a base station, at least one parameter for a search space, monitor, on the search space, DCI related with power saving, the search space being identified based on the at least one parameter, and the DCI including a wake up signal indicating whether to monitor a PDCCH and a BWP indication related with the wake up signal, and perform a PDCCH monitoring based on the wake up signal and the BWP indication included in the DCI.

In accordance with another aspect of the disclosure, a base station in a wireless communication system includes a transceiver, and a processor coupled with the transceiver and configured to transmit, to a terminal, at least one parameter for a search space, and transmit, on the search space, DCI related with power saving, the search space being identified based on the at least one parameter, and the DCI including a wake up signal indicating whether to monitor a PDCCH and a BWP indication related with the wake up signal, wherein a PDCCH monitoring is performed at the terminal based on the wake up signal and the BWP indication included in the DCI.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
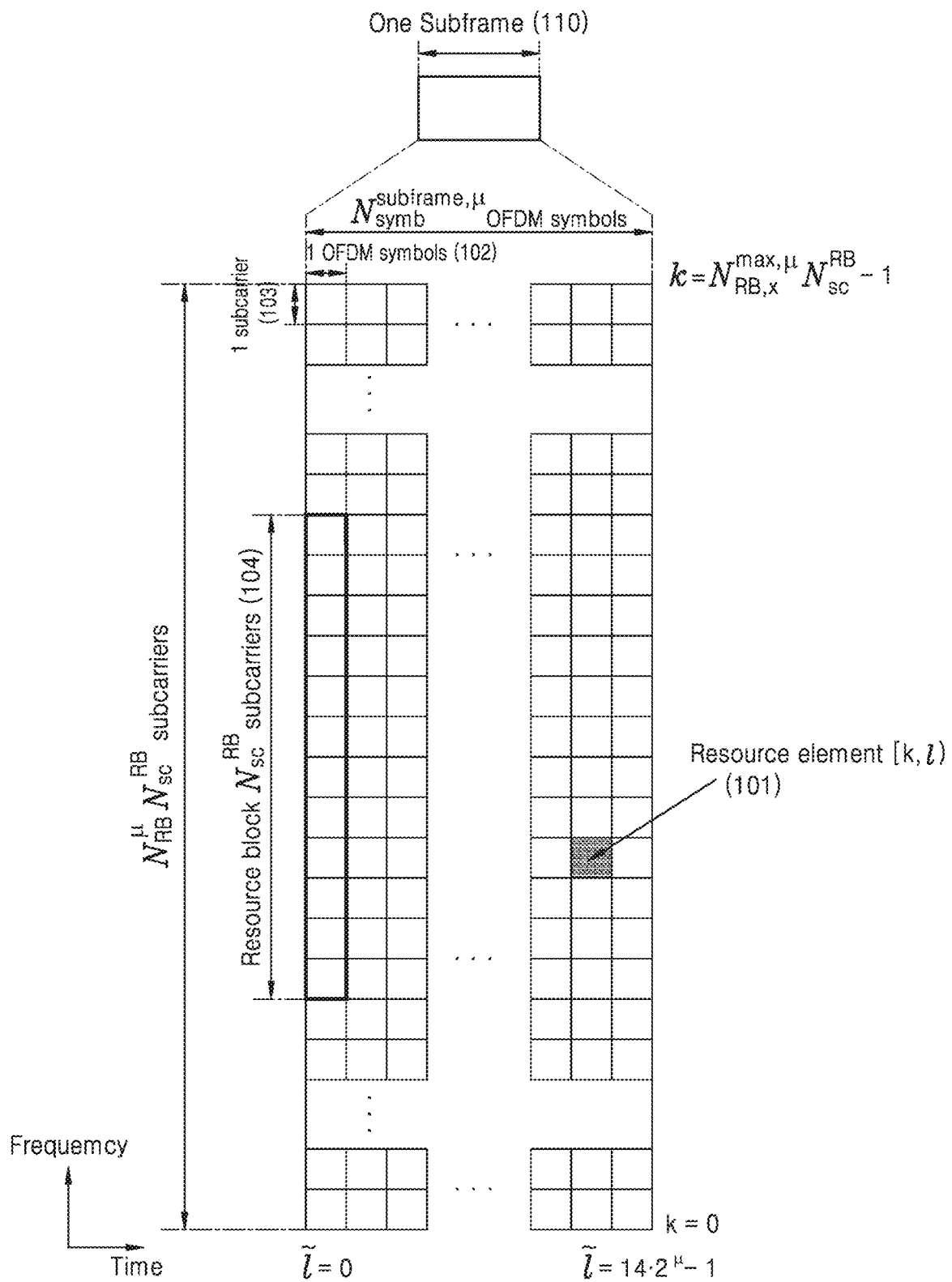
FIG. 1 illustrates a basic structure of a time-frequency domain of a next generation mobile communication system according to an embodiment.

Hereinafter, embodiments of the disclosure may be described with reference to accompanying drawings. Accordingly, those of ordinary skill in the art will recognize that modifications, equivalents, and/or alternatives on the embodiments described herein can be variously made without departing from the scope and spirit of the disclosure. With regard to description of drawings, similar components may be marked by similar reference numerals. Descriptions of well-known functions and/or configurations will be omitted for the sake of clarity and conciseness.

Throughout the disclosure, the expression "at least one of a, b or c" indicates only a, only b, only c, both a and b, both a and c, both b and c, all of a, b, and c, or variations thereof.

Components included in the disclosure may be expressed as a singular or plural. However, singular or plural representations are selected appropriately for the sake of convenience of description, and the disclosure is not limited thereto. Even a component expressed as a singular element may be composed of plural elements, and vice versa.

Examples of a terminal may include a user equipment (UE), a mobile station (MS), a cellular phone, a smartphone, a computer, and a multimedia system capable of performing a communication function.

In the disclosure, a controller may also be referred to as a processor.

In the disclosure, a layer (or a layer apparatus) may also be referred to as an entity.

Some elements in the drawings are exaggerated, omitted, or schematically illustrated. Also, a size of each element does not entirely reflect an actual size of the element. In the drawings, the same or corresponding elements may be denoted by the same reference numerals.

The advantages and features of the disclosure and methods of achieving them will become apparent with reference to embodiments described in detail along with the related drawings. The disclosure may, however, be embodied in many different forms and should not be construed as limited to embodiments of the disclosure set forth herein; rather, these embodiments are provided so that this disclosure will be thorough and complete, and will fully convey the scope of the disclosure to one of ordinary skill in the art.

In the specification, the same reference numerals denote the same elements. The terms used herein are those defined in consideration of functions in the disclosure, but may vary according to the intention of users or operators. Therefore, the terms used herein have to be defined based on the meaning of the terms together with the description throughout the specification.

Hereinafter, a base station is an entity performing resource allocation for a terminal and may include at least one of a gNode B, a Gnb, an eNode B, a node B, a base station (BS), a radio access unit, a base station controller, or a node on a network. A terminal may include a UE, an MS, a cellular phone, a smartphone, a computer, or a multimedia system capable of performing a communication function. A downlink (DL) refers to a path for transmission of signals from a base station to a terminal, and an uplink (UL) refers to a path for wireless transmission of signals from a terminal to a base station. In addition, although embodiments of the disclosure are described hereinafter by taking a long term evolution (LTE)/LTE-Advanced (LTE-A) system as an example, the embodiments of the disclosure may also be applied to other communication systems having similar technical backgrounds or channel types, such as 5G mobile communication technology (e.g., 5G new radio (NR)) developed after LTE-A, and 5G may be a concept including LTE, LTE-A, and other similar services. Embodiments may also be applied to other communication systems by making some changes or modifications therein without departing from the spirit and scope of the disclosure.

The term "unit" used in the disclosure refers to a software or hardware component, such as a field-programmable gate array (FPGA) or an application-specific integrated circuit (ASIC), which performs certain tasks. However, "unit" is not limited to software or hardware. The term "unit" may be configured to be in an addressable storage medium or configured to operate one or more processors. Thus, "unit" may include software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "units" may be combined into fewer components and "units" or further separated into additional components and "units". Components and "units" may be implemented to operate one or more central processing units (CPUs) in a device or a security multimedia card. A unit may include one or more processors.

The disclosure relates to a method and apparatus for monitoring a PDCCH in a wireless communication system, wherein PDCCH may refer to control information.

FIG. 1 illustrates a basic structure of a time-frequency domain of a next generation mobile communication system according to an embodiment.

Referring to FIG. 1, the horizontal axis represents a time domain, and the vertical axis represents a frequency domain in FIG. 1. A basic resource unit in the time-frequency domain may be a resource element (RE) 101. The resource element 101 may be defined by an OFDM symbol 102 in a time axis and a first subcarrier 103 in a frequency axis. In the frequency domain, $N_{sc}^{RB}$ continuous REs ($N_{sc}^{RB}$ is 12 in FIG. 1) may constitute one resource block (RB) 104. A plurality of OFDM symbols may constitute one subframe 110.

Figure 2:
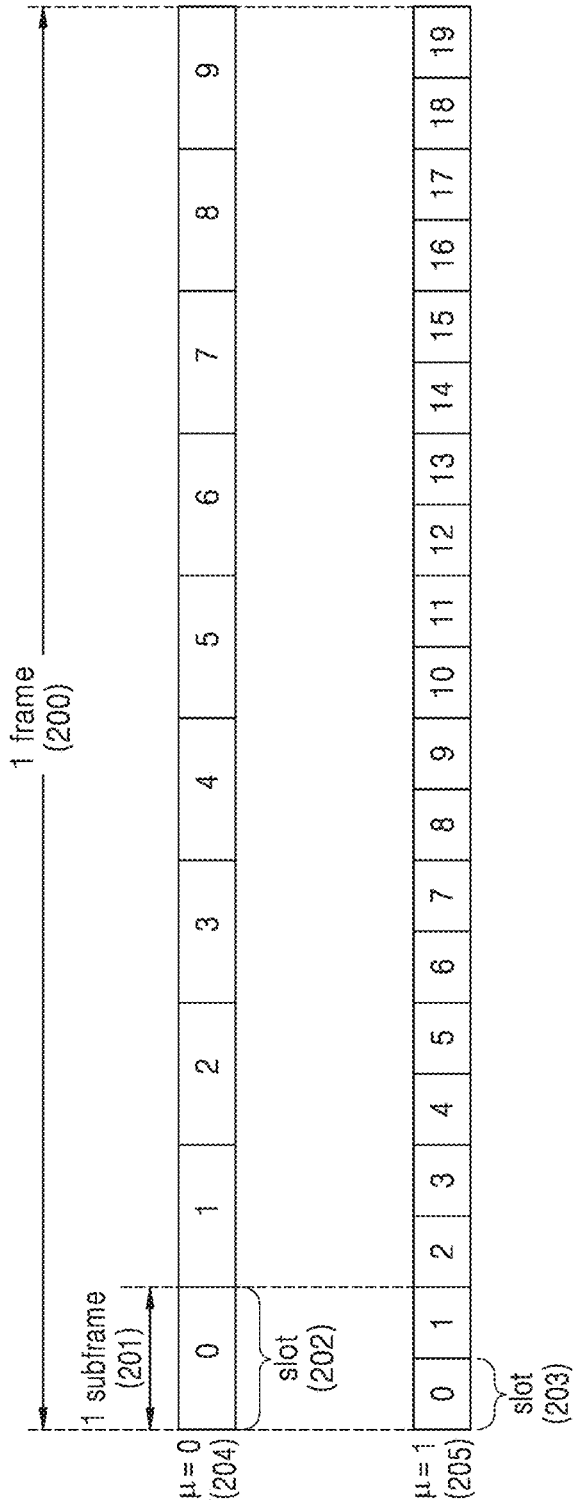
FIG. 2 illustrates a frame, a subframe, and a slot structure of a next generation mobile communication system according to an embodiment.

FIG. 2 illustrates a frame, a subframe, and a slot structure of a next generation mobile communication system according to an embodiment.

Specifically, FIG. 2 illustrates a frame 200, a subframe 201, and a slot 202. The frame 200 may be defined to have a length of 10 ms. Because the subframe 201 may be defined to have a length of 1 ms, one frame 200 may include 10 subframes 201.

One slot 202 or 203 may be defined by 14 OFDM symbols (i.e., the number of symbols per slot ($N_{symb}^{slot}$)=14). One subframe 201 may include one or more slots 202 or 203, and the number of slots 202 or 203 per subframe 201 may vary according to a subcarrier spacing set value μ. FIG. 2 illustrates an instance 204 where the subcarrier spacing set value μ is 0 and an instance 205 where the subcarrier spacing set value μ is 1. In 204 of μ=0, one subframe 201 may include one slot 202, and in 205 of μ=1, one subframe 201 may include two slots 203. That is, according to the subcarrier spacing set value μ, the number ($N_{slot}^{subframe,\mu}$) of slots per subframe may vary, and thus the number ($N_{slot}^{frame,\mu}$) of slots per frame may vary. The numbers $N_{slot}^{subframe,\mu}$ and $N_{slot}^{frame,\mu}$ according to the subcarrier spacing set value μ may be defined as shown in Table 1, as follows.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Figure 3:
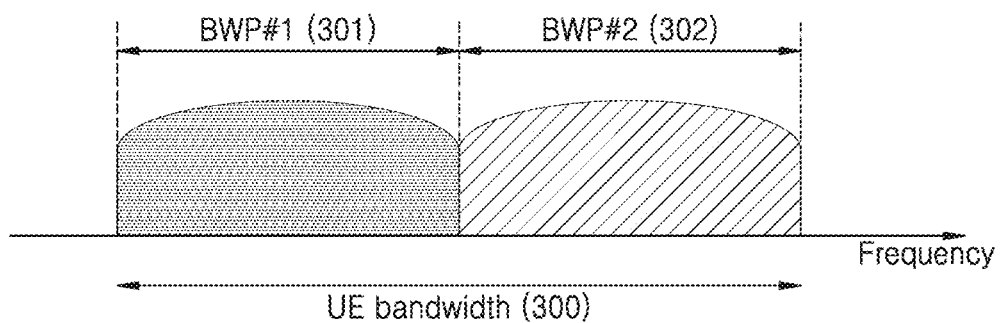
FIG. 3 illustrates a configuration of a bandwidth part (BWP) of a next generation mobile communication system according to an embodiment.

FIG. 3 illustrates a configuration of a bandwidth part (BWP) in a 5G communication system according to an embodiment.

Referring to FIG. 3, a UE bandwidth 300 includes a BWP #1 301 and a BWP #2 302. A base station may configure one or more BWPs in a terminal and may configure information as shown in Table 2 for each BWP, as follows.

TABLE 2

| BWP ::= | SEQUENCE { |
|---|---|
| bwp-Id | BWP-Id, |
| (BANDWIDTH PART IDENTIFIER) | |
| locationAndBandwidth | INTEGER (1..65536), |
| (BANDWIDTH PART LOCATION) | |
| subcarrierSpacing | ENUMERATED {n0, n1, n2, |
| (SUBCARRIE[ ]R SPACING) | n3, n4, n5}, |
| cyclicPrefix | ENUMERATED |
| (CYCLIC PREFIX) | { extended } |
| } | |

The disclosure is not limited to the above examples, and various parameters related to the BWP in addition to the above configuration information may be configured in the terminal. The above information may be transmitted from the base station to the terminal through radio resource control (RRC) signaling. At least one BWP from among the configured one or more BWPs may be activated. Whether the configured BWP is activated may be semi-statically transmitted from the base station to the terminal through RRC signaling or may be dynamically transmitted through DCI to the terminal.

The terminal before RRC connection may be given an initial BWP for initial access through a master information block (MIB) from the base station. In order to receive system information (e.g., remaining system information (RMSI) or system information block 1 (SIB1)) necessary for initial access through the MIB in an initial access step, the terminal may receive configuration information for a search space and a control region (e.g., a control resource set (CORESET)) where a PDCCH may be transmitted. An identifier (ID) of the control region and the search space configured through the MIB may be considered as 0. The base station may notify configuration information such as frequency allocation information, time allocation information, and a numerology for a control region #0 through the MIB to the terminal. The base station may notify configuration information for an occasion and a monitoring period for the control region #0, that is, configuration information for a search space #0, through the MIB to the terminal. The terminal may consider a frequency domain configured as the control region #0 obtained from the MIB as the initial BWP for initial access. In this case, an ID of the initial BWP may be considered as 0.

A configuration of a BWP supported by a next generation mobile communication system (e.g., a 5G or NR system) may be used for various purposes.

When a bandwidth supported by a terminal is smaller than a system bandwidth, a base station may support terminal through a configuration of a BWP. For example, the base station may configure a frequency position (configuration information 2) of a BWP in the terminal so that the terminal transmits/receives data at a specific frequency position within the system bandwidth.

In order to support different numerologies, the base station may configure a plurality of BWPs in the terminal. For example, in order to support data transmission/reception using both a subcarrier spacing of 15 kilohertz (kHz) and a subcarrier spacing of 30 kHz to/from a specific terminal, the base station may configure two BWPs as subcarrier spacings of 15 kHz and 30 kHz. Different BWPs may be frequency division multiplexed. When data is to be transmitted/received at a specific subcarrier spacing, a BWP configured as the specific subcarrier spacing may be activated.

In order to reduce power consumption of the terminal, the base station may configure BWPs having different bandwidths in the terminal. For example, when the terminal supports a very large bandwidth, e.g., a bandwidth of 100 MHz, and always transmits/receives data in the bandwidth, excessively high power consumption may occur. In particular, monitoring an unnecessary downlink control channel through a large bandwidth of 100 MHz when there is no traffic may be very inefficient from the aspect of power consumption. In order to reduce power consumption of the terminal, the base station may configure a BWP having a relatively small bandwidth of 20 MHz in the terminal. The terminal may perform a monitoring operation in a BWP of 20 MHz when there is no traffic, and when data is generated, the terminal may transmit/receive data in a BWP of 100 MHz according to indication of the base station.

In the above method of configuring a BWP, terminals before RRC connection may receive configuration information for an initial BWP through an MIB in an initial access step. In more detail, a terminal may be given a control region (e.g., a CORESET) for a downlink control channel through which DCI for scheduling a system information block (SIB) may be transmitted, from an MIB of a physical broadcast channel (PBCH). A bandwidth of the control region configured through the MIB may be considered as an initial BWP, and the terminal may receive a physical downlink data channel (PDSCH) through which the SIB is transmitted by using the configured initial BWP. The initial BWP may be used for the purpose of other system information (OSI), paging, and random access as well as receiving the SIB.

A synchronization signal (SS)/PBCH block of a next generation mobile communication system (e.g., a 5G or NR system) will now be described.

An SS/PBCH block may refer to a physical layer channel block including a primary SS (PSS), a secondary SS (SSS), and a PBCH. In more detail, the SS/PBCH block may be defined as follows.

PSS: It is a reference signal for downlink time/frequency synchronization and may provide some information of a cell ID.

SSS: It is a reference signal for downlink time/frequency synchronization and may provide remaining cell ID information that is not provided by the PSS. In addition, it may serve as a reference signal for demodulation of the PBCH.

PBCH: It may provide required system information necessary for data channel and control channel transmission/reception of a terminal. The required system information may include search space related control information indicating wireless resource mapping information of a control channel, scheduling control information about a separate data channel through which system information is transmitted, etc.

SS/PBCH block: The SS/PBCH block may include a combination of the PSS, the SSS, and the PBCH. One or more SS/PBCH blocks may be transmitted within 5 ms, and each transmitted SS/PBCH block may be identified by an index.

The terminal may detect the PSS and the SSS in an initial access step, and may decode the PBCH. The terminal may obtain an MIB from the PBCH, and may be given a control region #0 from the MIB. Assuming that a demodulation reference signal (DMRS) transmitted from a selected SS/PBCH block and the control region #0 is quasi co-located (QCL), the terminal may perform monitoring on the control region #0. The terminal may receive system information by using DCI transmitted by the control region #0. The terminal may obtain random access channel (RACH) related configuration information necessary for initial access from the received system information. The terminal may transmit a physical RACH (PRACH) to a base station in consideration of an index of the selected SS/PBCH block, and the base station receiving the PRACH may obtain information about the index of the SS/PBCH block selected by the terminal. The base station may determine which block the terminal selects from among SS/PBCH blocks and whether the terminal performs monitoring on the control region #0 associated with the selected block.

DCI in a next generation mobile communication system will now be described in detail.

Scheduling information for uplink data (or a physical uplink shared channel (PUSCH)) or downlink data (or a PDSCH) may be transmitted through DCI from a base station to a terminal. The terminal may monitor a fallback DCI format and a non-fallback DCI format for the PUSCH or the PDSCH. The fallback DCI format may include a predefined field fixed between the base station and the terminal, and the non-fallback DCI format may include a configurable field.

The DCI may be transmitted through a PDCCH through channel coding and modulation. A cyclic redundancy check (CRC) may be attached to the payload of a DCI message, and may be scrambled by a radio network temporary identifier (RNTI) that corresponds to an identity of the terminal. Different RNTIs may be used according to the purpose of the DCI message, for example, UE-specific data transmission, power control command, or random access response. That is, the RNTI may not be explicitly transmitted but may be transmitted by being included in a CRC computation process. Upon receiving the DCI message transmitted through the PDCCH, the terminal may check the CRC by using the allocated RNTI. When a confirmation result of the CRC is correct, the terminal may determine that the DCI message is transmitted to the terminal.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling the PDSCH for a paging message may be scrambled by a P-RNTI. DCI for notifying a slot format identifier (SFI) may be scrambled by an SFI-RNTI. DCI for notifying a transmit power control (TPC) may be scrambled by a TPC-RNTI. DCI for scheduling a UE-specific PDSCH or PUSCH may be scrambled by a cell RNTI (C-RNTI).

A DCI format 0_0 may be used as a fallback DCI for scheduling a PUSCH, and in this case, a CRC may be scrambled by a C-RNTI. The DCI format 0_0 in which the CRC is scrambled by the C-RNTI may include information as shown in Table 3, as follows.

TABLE 3

Identifier for DCI formats—[1] bit
Frequency domain resource assignment—$[\lceil \log_2(N_{RB}^{UL,BWP}(N_{RB}^{UL,BWP} + 1)/2)\rceil]$ bits
Time domain resource assignment—X bits
Frequency hopping flag—1 bit
Modulation and coding scheme—5 bits
New data indicator—1 bit
Redundancy version—2 bits
HARQ process number—4 bits
TPC command for scheduled PUSCH—[2] bits
UL/SUL indicator—0 or 1 bit A DCI format 0_1 may be used as a non-fallback DCI for scheduling a PUSCH, and in this case, a CRC may be scrambled by a C-RNTI. The DCI format 0_1 in which the CRC is scrambled by the C-RNTI may include information as shown in Table 4, as follows.

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP} + 1)/2 \rceil$ bits
Time domain resource assignment - 1, 2, 3, or 4 bits
VRB-to-PRB mapping (virtual resource block-to-physical resource block mapping) - 0 or 1 bit, only for resource allocation type 1.
    0 bit if only resource allocation type 0 is configured:
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
$1^{st}$ downlink assignment index - 1 or 2 bits
    1 bit for semi-static HARQ-ACK codebook;
    2 bits for dynamic HARQ-ACK codebook with single HARQ-ACK codebook.
$2^{nd}$ downlink assignment index - 0 or 2 bits
    2 bits for dynamic HARQ-ACK codebook with two HARQ-ACK sub-codebooks;
    0 bit otherwise.
TPC command for scheduled PUSCH -2 bits TABLE 4-continued SRS resource indicator - $\left\lceil \log_2\left(\sum_{k=1}^{L_{max}} \binom{N_{SRS}}{k}\right)\right\rceil$ or $\lceil \log_2(N_{SRS})\rceil$ bits $\left\lceil \log_2\left(\sum_{k=1}^{L_{max}} \binom{N_{SRS}}{k}\right)\right\rceil$ bits for non-codebook based PUSCH transmission;
$\lceil \log_2(N_{SRS})\rceil$ bits for codebook based PUSCH transmission.
Precoding information and number of layers - up to 6 bits
Antenna ports - up to 5 bits
SRS request -2 bits
CSI request - 0, 1, 2, 3, 4, 5, or 6 bits
CBG (code block group) transmission information - 0, 2, 4, 6, or 8 bits
PTRS-DMRS association - 0 or 2 bits.
beta_offset indicator - 0 or 2 bits
DMRS sequence initialization - 0 or 1 bit A DCI format 1_0 may be used as a fallback DCI for scheduling a PDSCH, and in this case, ta CRC may be scrambled by a C-RNTI. The DCI format 1_0 in which the CRC is scrambled by the C-RNTI may include information as shown in Table 5, as follows.

TABLE 5

Identifier for DCI formats—[1] bit
Frequency domain resource assignment—$\lceil \log_2 N_{RB}^{DL,BWP}(N_{RB}^{DL,BWP}+1)/2)\rceil$ bits
Time domain resource assignment—X bits
VRB-to-PRB mapping—1 bit.
Modulation and coding scheme—5 bits
New data indicator—1 bit
Redundancy version—2 bits
HARQ process number—4 bits
Downlink assignment index—2 bits
TPC command for scheduled PUCCH—[2] bits
PUCCH(physical uplink control channel) resource indicator—3 bits
PDSCH-to-HARQ feedback timing indicator—[3] bits A DCI format 1_1 may be used as a non-fallback DCI for scheduling a PDSCH, and in this case, a CRC may be scrambled by a C-RNTI. The DCI format 1_1 in which the CRC is scrambled by the C-RNTI may include information as shown in Table 6, as follows.

TABLE 6

Figure 4:
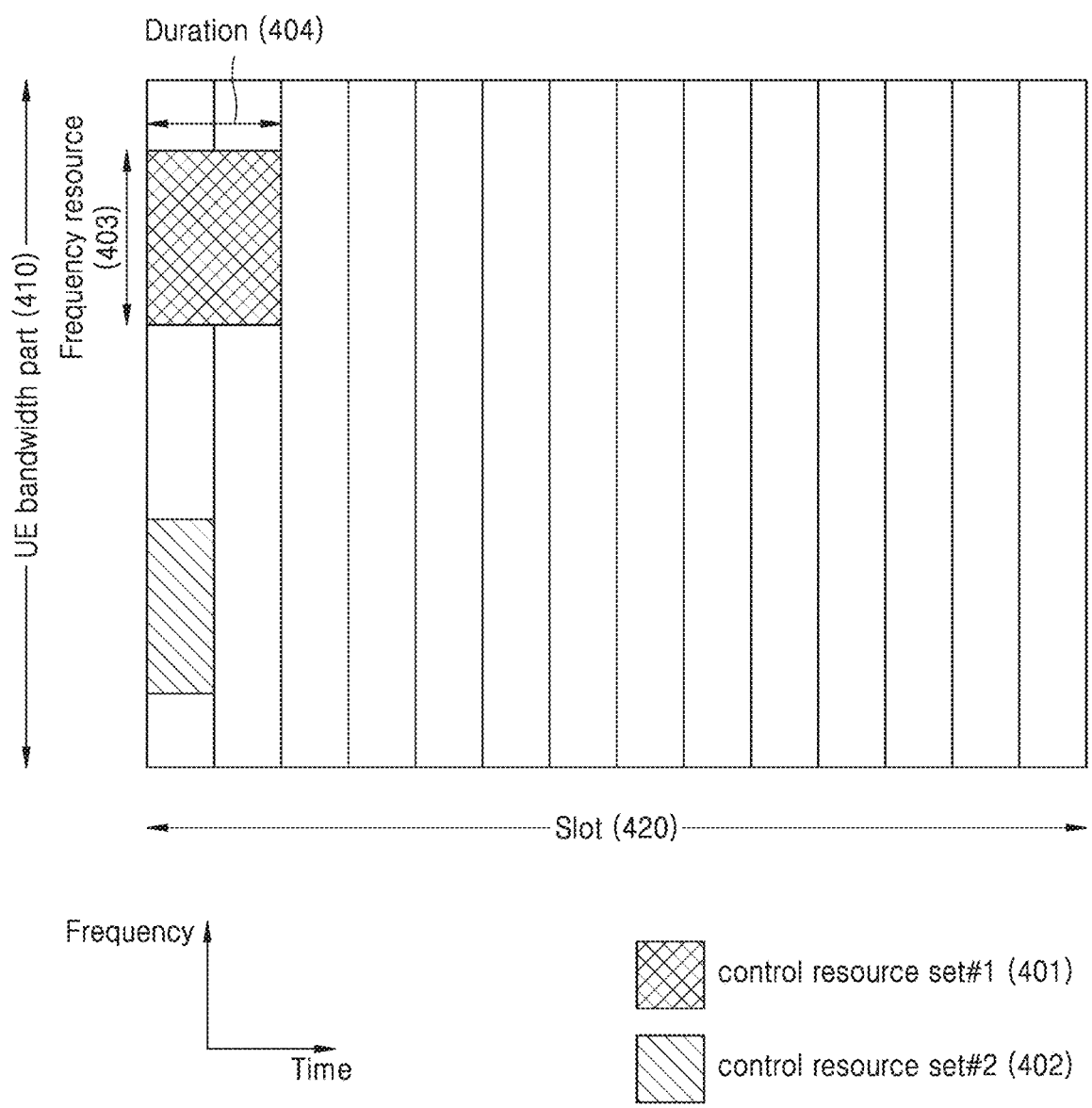
FIG. 4 illustrates a configuration of a control region of a downlink control channel of a next generation mobile communication system according to an embodiment.

Carrier indicator—0 or 3 bits
Identifier for DCI formats—[1] bits
Bandwidth part indicator—0, 1 or 2 bits
Frequency domain resource assignment
For resource allocation type 0, $\lceil N_{RB}^{DL,BWP}/P\rceil$ bits
For resource allocation type 1, $\lceil \log_2(N_{RB}^{DL,BWP}(N_{RB}^{DL,BWP}+1)/2)\rceil$ bits
Time domain resource assignment—1, 2, 3, or 4 bits
VRB-to-PRB mapping—0 or 1 bit, only for resource allocation type 1.
0 bit if only resource allocation type 0 is configured;
1 bit otherwise.
PRB bundling size indicator—0 or 1 bit
Rate matching indicator—0, 1, or 2 bits
ZP CSI-RS trigger—0, 1, or 2 bits
For transport block 1:
Modulation and coding scheme—5 bits
New data indicator—1 bit
Redundancy version—2 bits
For transport block 2:
Modulation and coding scheme—5 bits
New data indicator—1 bit
Redundancy version—2 bits
HARQ process number—4 bits
Downlink assignment index—0 or 2 or 4 bits
TPC command for scheduled PUCCH—2 bits
PUCCH resource indicator—3 bits TABLE 6-continued PDSCH-to-HARQ_feedback timing indicator—3 bits
Antenna ports—4, 5 or 6 bits
Transmission configuration indication—0 or 3 bits
SRS request—2 bits
CBG transmission information—0, 2, 4, 6, or 8 bits
CBG flushing out information—0 or 1 bit
DMRS sequence initialization—1 bit FIG. 4 illustrates a configuration of a control region of a downlink control channel of a next generation mobile communication system according to an embodiment. That is, FIG. 4 illustrates a CORESET where a downlink control channel is transmitted in a 5G wireless communication system according to an embodiment.

Referring to FIG. 4, two control regions (i.e., a control resource set #1 401 and a control resource set #2 402) are configured in one slot 420 along a time axis and a BWP 410 of a terminal along a frequency axis in FIG. 4. The control resource sets 401 and 402 may be configured in a specific frequency resource 403 within the entire terminal BWP 410 along the frequency axis. The control resource sets 401 and 402 may be configured with one or more OFDM symbols along the time axis, and may be defined by a control resource set duration 404. In FIG. 4, the control resource set #1 401 may be set to a two-symbol control resource set duration, and the control resource set #2 402 may be set to a one-symbol control resource set duration.

A control region in a next generation mobile communication system may be configured through higher layer signaling (e.g., SIB, MIB, or RRC signaling) from a base station to a terminal. When the control region is configured in the terminal, this indicates that information such as a control region identifier, a frequency position of the control region, and a symbol length of the control region is provided. For example, a configuration of the control region may include information as shown in Table 7, as follows.

TABLE 7

```
ControlResourceSet ::=    SEQUENCE {
-- Corresponds to L1 parameter 'CORESET-ID'
controlResourceSetId       ControlResourceSetId,
(CONTROL REGION IDENTIFIER (Identity))
frequencyDomainResources       BIT STRING (SIZE (45)),
(FREQUENCY AXIS RESOURCE ALLOCATION INFORMATION)
duration             INTEGER (1..maxCoReSetDuration),
(TIME AXIS RESOURCE ALLOCATION INFORKATION)
cce-REG-MappinqType            CHOICE {
(CCE-TO-REG MAPPING TYPE)
   interleaved              SEQUENCE {
   reg-BundleSize     ENUMERATED (n2, n3, n6),
   (REG BUNDLE SIZE)
   precoderGranularity     ENUMERATED {sameAsREG-bundle,
allContiguousRBs},
   interleaverSize            ENUMERATED {n2, n3, n6}
   (INTERLEAVER SIZE)
   shiftIndex
   INTEGER(0..maxNrofPhysicalResourceBlocks-1)    OPTIONAL
   (INTERLEAVER SHIFT (Shift))
   },
   nonInterleaved            NULL
},
   tci-StatesPDCCH            SEQUENCE(SIZE(1..maxNrofTCI-
StatesPDCCH)) OF TCI-StateId        OPTIONAL,
   (QCL CONFIGURATION INFORMATION)
   tci-PresentInDCI     ENUMERATED {enabled}     OPTIONAL,
   -- Need S
}
```

The tci-StatesPDCCH (hereinafter, TCI state) configuration information in Table 7 may include information of one or more SS/PBCH block indexes or channel state information reference signal (CSI-RS) having a quasi co-Location (QCL) relationship with a DMRS transmitted in the control region.

Figure 5:
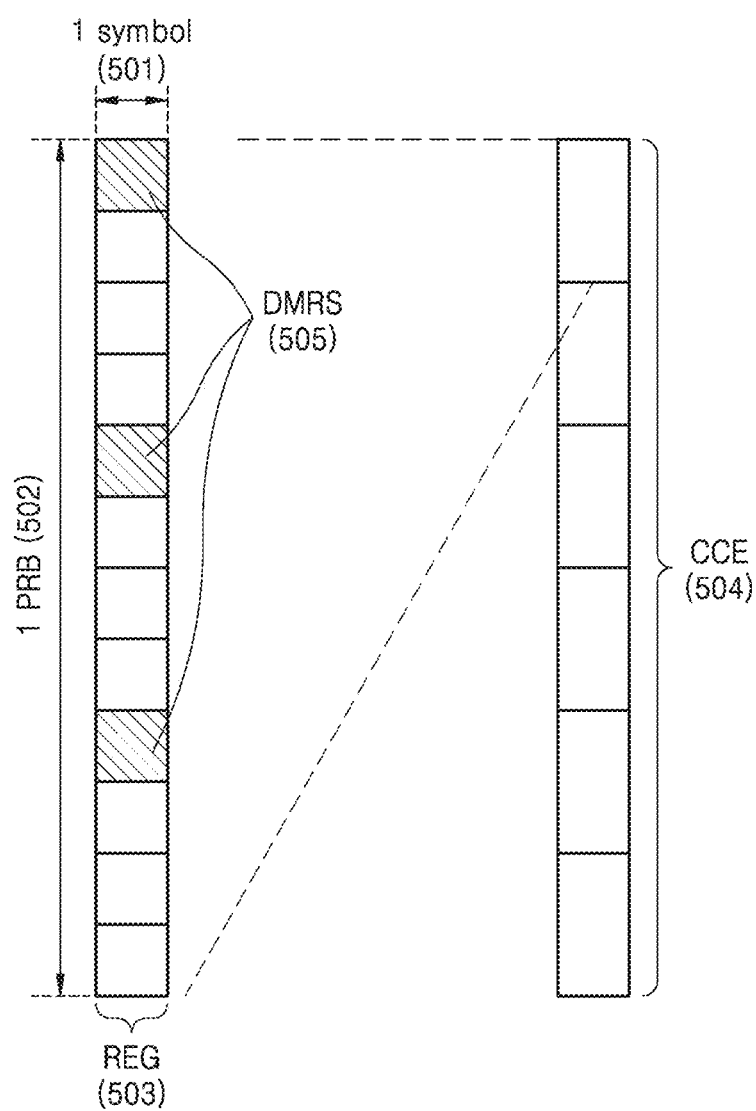
FIG. 5 illustrates a structure of a downlink control channel of a next generation mobile communication system according to an embodiment.

FIG. 5 illustrates a structure of a downlink control channel of a next generation mobile communication system according to an embodiment. That is, FIG. 5 illustrates a basic unit of a time-and-frequency resource constituting a downlink control channel that may be used in 5G according to an embodiment.

Referring to FIG. 5, the basic unit of the time-and-frequency resource constituting the control channel may be defined as a resource element group (REG) 503. The REG 503 may include one OFDM symbol 501 along a time axis and one physical resource block (PRB) 502, that is, 12 subcarriers, along a frequency axis. A base station may configure a downlink control channel allocation unit in concatenation with the REG 503.

As shown in FIG. 5, when a basic unit in which a downlink control channel is allocated in 5G is a control channel element (CCE) 504, one CCE 504 may include a plurality of REGs 503, such as 12 REs, and when one CCE 504 includes 6 REGs 503, one CCE 504 may include 72 REs. When a downlink control region is configured, the downlink control region may include a plurality of CCEs 504, and a specific downlink control channel may be mapped to one or more CCEs 504 and may be transmitted according to an aggregation level (AL) in the control region. The CCEs 504 in the control region may be distinguished with numbers, in which case the numbers of the CCEs 504 may be assigned according to a logical mapping scheme.

The basic unit, that is, the REG 503, of the downlink control channel of FIG. 5 may include REs to which DCI is mapped and a region to which a DMRS 505 that is a reference signal for decoding the REs is mapped. As shown in FIG. 5, three DMRSs 505 may be transmitted in one REG 503. The number of CCEs necessary to transmit a PDCCH may be 1, 2, 4, 8, or 16 according to an aggregation level (AL), and different numbers of CCEs may be used to implement link adaptation of the downlink control channel.

For example, when AL=L, one downlink control channel may be transmitted through L CCEs.

A terminal should detect a signal without knowing information about the downlink control channel, and a search space denoting a set of CCEs for blind decoding may be defined. The search space is a set of downlink control channel candidates including CCEs which the terminal has to attempt to decode at a given aggregation level. Because there are several aggregation levels for bundling up 1, 2, 4, 8, or 16 CCEs, the terminal may include a plurality of search spaces. A search space set may be defined as a set of search spaces at all configured aggregation levels.

A search space may be classified into a common search space and a UE-specific search space. A certain group of terminals or all terminals may investigate a common search space of a PDCCH to receive cell-common control information such as a paging message or dynamic scheduling for system information. For example, the terminals may receive PDSCH scheduling allocation information for SIB transmission including cell service provider information or the like by investigating the common search space of the PDCCH. Because a certain group of terminals or all terminals should receive a PDCCH, a common search space may be defined as a set of CCEs that are previously agreed on. A terminal may receive scheduling allocation information for a UE-specific PDSCH or PUSCH by investigating a UE-specific search space of a PDCCH. The UE-specific search space may be UE-specifically defined through a function of various system parameters and an identity of the terminal.

Parameters for a search space of a PDCCH in 5G may be configured through higher layer signaling by a base station in a terminal. For example, the base station may configure, in the terminal, the number of PDCCH candidates at each aggregation level L, a monitoring period for the search space, a monitoring occasion of a symbol unit within a slot for the search space, a search space type (e.g., a common search space or a UE-specific search space), a combination of a DCI format and an RNTI to be monitored in the search space, and a control region index for monitoring the search space. For example, a configuration may include information as shown in Table 8, as follows.

TABLE 8

```
SearchSpace ::=                          SEQUENCE {
    Identity of: the search space. SearchSpaceId = 0 identifies the SearchSpace
 configured via PBCH (MIB) or ServingCellConfigCommon.
    searchSpaceId                        SearchSpaceId,
 (SEARCH SPACE IDENTIFIER)
    controlResourceSetId                 ControlResourceSetId,
 (CONTROL REGION IDENTIFIER )
    monitoringSlotPeriodicityAndOffset   CHOICE {
 (MONITORING SLOT LEVEL PERIOD)
        sl1                              NULL,
        sl2                              INTEGER (0..1),
        sl4                              INTEGER (0..3),
        sl5                              INTEGER (0..4),
        sl8                              INTEGER (0..7),
        sl10                             INTEGER (0..9),
        sl16                             INTEGER (0,.15),
        sl20                             INTEGER (0..19)
    }                                                        OPTIONAL,
    duration (MONITORING LENGTH)         INTEGER (2..2559)
    monitoringSymbolsWithinSlot                              BIT STRING (SIZE
 (14))          OPTIONAL,
        (MONITORING SYMBOL WITHIN SLOT)
    nrofCandidates                                           SEQUENCE {
    (NUMBER OF PDCCH CANDIDATES PER AGGREGATION LEVEL)
        aggregationLevel1                ENM/FERATED {n0, n1, n2, n3, n4, n5, n6, n8},
        aggregationLevel2                ENUMERATED {n0, n1, n2, n3, n4, n5, n6, n8},
        aggregationLevel4                ENUMERATED {n0, n1, n2, n3, n4, n5, n6, n8},
        aggregationLevel8                ENUMERATED {n0, nl, n2, n3, n4, n5, n6, n8},
```

TABLE 8-continued

```
    aggregationLevel16          ENUMERATED {n0, n1, n2, n3, n4, n5, n6, n8}
    },
    searchSpaceType             CHOICE {
    (SEARCH SPACE TYPE)
    -- Configures this search space as common search space (CSS) and DCI formats
to monitor.
        common                  SEQUENCE {
        (COMMON SEARCH SPACE)
    }
    ue-Specific                 SEQUENCE {
    (UE-SPECIFIC SEARCH SPACE)
    -- Indicates whether the UE monitors in this USS for DCI formats 0-0 and
1-0 or for formats 0-1 and 1-1.
        formats                 ENUMERATED    {formats0-0-And-1-0,
formats0-1-And-1-1},
        ...
    }
```

For example, in the table 8, configuration information for the search space includes the search space identifier, the control region identifier, the monitoring slot level period, the monitoring length, the monitoring symbol within slot, the number of PDCCH candidates per aggregation level, the search space type, the common search space, the UE-specific search space etc. Based on configuration information, the base station may configure one or more search space sets in the terminal. The base station may configure a search space set 1 and a search space set 2 in the terminal, and may configure a DCI format A scrambled by an X-RNTI in the search space set 1 to be monitored in a common search space and a DCI format B scrambled by a Y-RNTI in the search space set 2 to be monitored in a UE-specific search space.

According to the configuration information, one or more search space sets may exist in the common search space or the UE-specific search space. For example, search space set #1 and search space set #2 may be configured in the common search space, and search space set #3 and search space set #4 may be configured in the UE-specific search space.

In the common search space, a combination of the following DCI format and RNTI may be monitored. However, the disclosure is not limited to the following example.
DCI format 0_0/1_0 with CRC scrambled by C-RNTI, CS-RNTI, SP-CSI-RNTI, RA-RNTI, TC-RNTI, P-RNTI, SI-RNTI
DCI format 2_0 with CRC scrambled by SFI-RNTI
DCI format 2_1 with CRC scrambled by INT-RNTI
DCI format 2_2 with CRC scrambled by TPC-PUSCH-RNTI, TPC-PUCCH-RNTI
DCI format 2_3 with CRC scrambled by TPC-SRS-RNTI In the UE-specific search space, a combination of the following DCI format and RNTI may be monitored. However, the disclosure is not limited thereto.
DCI format 0_0/1_0 with CRC scrambled by C-RNTI, CS-RNTI, TC-RNTI
DCI format 1_0/1_1 with CRC scrambled by C-RNTI, CS-RNTI, TC-RNTI Specified RNTIs may comply with the following definitions and uses.

Cell RNTI (C-RNTI): used for scheduling a UE-specific PDSCH

Temporary Cell RNTI (TC-RNTI): used for scheduling a UE-specific PDSCH

Configured Scheduling RNTI (CS-RNTI): used for scheduling a semi-statically configured UE-specific PDSCH Random Access RNTI (RA-RNTI): used for scheduling a PDSCH in a random access step Paging RNTI (P-RNTI): used for scheduling a PDSCH for transmitting paging System Information RNTI (SI-RNTI): used for scheduling a PDSCH for transmitting system information Interruption RNTI (INT-RNTI): used for notifying whether a PDSCH is punctured Transmit Power Control for PUSCH RNTI (TPC-PUSCH-RNTI): used for indicating a power control command for a PUSCH Transmit Power Control for PUCCH RNTI (TPC-PUCCH-RNTI): used for indicating a power control command for a PUCCH Transmit Power Control for SRS RNTI (TPC-SRS-RNTI): used for indicating a power control command for an SRS The above DCI formats may be defined as shown in Table 9, as follows.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

A search space at an aggregation level L in a control region p and a search space set s in 5G may be expressed as shown in Equation [1], as follows.

$$L \cdot \left\{ \left( Y_{p,n_{s,f}^\mu} + \left\lfloor \frac{m_{s,n_{CI}} \cdot N_{CCE,p}}{L \cdot M_{p,x,max}^{(L)}} \right\rfloor + n_{CI} \right) \bmod \lfloor N_{CCE,p} / L \rfloor \right\} + i. \quad [1]$$

In Equation [1]: -L: aggregation level
$n_{CI}$: carrier index
$N_{CCE,p}$: the total number of CCEs existing in the control region p
$n_{s,f}^\mu$: slot index
$M_{p,s,max}^{(L)}$: the number of PDCCH candidates at the aggregation level L $m_{sCI} = 0, \ldots, M^{(L)}_{p,s,max} - 1|$: index of a PDCCH candidate at the aggregation level L i = 0, ..., L-1

$$Y_{p,n^\mu_{s,f}} = \left(A_p \cdot Y_{p,n^\mu_{s,f}-1}\right) \bmod D \Big|, Y_{p,-1} = n_{RNTI} \neq 0 |,$$

$A_0 = 39827, A_1 = 39829, A_2 = 39829, D = 65537$ $n_{RNTI}$: terminal identifier A value of $Y\_(p,n^\mu_{s,f})$ may correspond to 0 in a common search space.

A value of $Y\_(p,n^\mu_{s,f})$ may correspond to a value that varies according to a time index and an identity of a terminal (an ID configured for the terminal by a base station or a C-RNTI) in the case of a UE-specific search space.

In 5G, a plurality of search spaces may be configured to have different parameters (e.g., parameters of Table 8). Accordingly, groups of search space sets monitored by a terminal may vary according to points of time. For example, when search space set #1 is configured in an X-slot cycle, search space set #2 is configured in a Y-slot cycle, and X and Y are different from each other, the terminal may monitor both search space set #1 and search space set #2 in a specific slot, and may monitor one of search space set #1 and search space set #2 in a specific slot.

When a plurality of search space sets is configured in the terminal, in order to determine a search space set to be monitored by the terminal, the following conditions may be considered.

Condition 1: Limit Maximum Number of PDCCH Candidates

The number of PDCCH candidates that may be monitored per slot may not exceed $M^\mu$. $M^\mu$ may be determined as a maximum number of PDCCH candidates per slot in a cell configured at a subcarrier spacing of $15 \cdot 2^\mu$ kHz, and may be defined as shown in Table 10, as follows.

TABLE 10

| μ | Maximum number of PDCCH candidates per slot and per serving cell ($M^\mu$) |
|---|---|
| 0 | 44 |
| 1 | 36 |
| 2 | 22 |
| 3 | 20 |

Condition 2: Limit Maximum Number of CCEs

The number of CCEs constituting all search spaces per slot (all search spaces may refer to all CCE sets corresponding to a union region of a plurality of search space sets) may not exceed $C^\mu$, which may be defined as a maximum number of CCEs per slot in a cell configured at a subcarrier spacing of $15 \cdot 2^\mu$ kHz, and may be defined as shown in Table 11 As follows.

TABLE 11

| μ | Maximum number of CCEs per slot and per serving cell ($C^\mu$) |
|---|---|
| 0 | 56 |
| 1 | 56 |
| 2 | 48 |
| 3 | 32 |

For convenience of explanation, a situation where Conditions 1 and 2 are satisfied at a specific point of time may be defined as Condition A. Accordingly, non-satisfaction of Condition A indicates that at least one of Condition 1 or 2 is not satisfied.

There may be an instance where Condition A is not satisfied at a specific point of time according to a configuration of search space sets of a base station. In this instance, the terminal may select and monitor only some of the search space sets so that Condition A is satisfied at the specific point of time, and the base station may transmit a PDCCH by using the selected search space sets.

A method of selecting only some search spaces from among all configured search space sets may comply with the following method.

Method 1

When Condition A for a PDCCH is not satisfied at a specific point of time (slot), A terminal (or a base station) may more preferentially select a search space set in which a search space type is configured as a common search space from among search space sets existing at the specific point of time than a search space set configured in which a search space type is configured as a UE-specific search space.

When all of search space sets configured as the common search space are selected (i.e., when Condition A is satisfied even after all search spaces configured as the common search space are selected), the terminal (or the base station) may select search space sets configured as the UE-specific search space. In this case, when there are multiple search space sets configured as the UE-specific search space, a search space set having a lower search space set index may have a higher priority number. In consideration of priority numbers, the terminal or the base station may select UE-specific search space sets only when Condition A is satisfied.

A time domain resource allocation method for a data channel in a next generation mobile communication system will now be described.

A base station may configure, through higher layer signaling, a table of time domain resource allocation information for a PDSCH and PUSCH in a terminal. A table including up to 16 entries (maxNrofDL-Allocations=16) may be configured for the PDSCH, and a table including up to 16 entries (maxNrofUL-Allocations=16) may be configured for the PUSCH. The time domain resource allocation information may include a PDCCH-to-PDSCH slot timing K0 (corresponding to a time interval of a slot unit between a point of time when a PDCCH is received and a point of time when the PDSCH scheduled by the received PDCCH is transmitted), a PDCCH-to-PUSCH slot timing K2 (corresponding to a time interval of a slot unit between a point of time when a PDCCH is received and a point of time when the PUSCH scheduled by the received PDCCH is transmitted), information about a position and a length of a start symbol of the scheduled PDSCH or PUSCH within a slot, and a mapping type of the PDSCH or the PUSCH. For example, information as shown in Table 12 or Table 13, as follows, may be notified from the base station to the terminal.

TABLE 12

PDSCH-TimeDomainResourceAllocationList information element

PDSCH-TimeDomainResourceAllocationList ::= SEQUENCE
(SIZE(1..maxNrofDL-Allocations)) OF PDSCH-TimeDomainResourceAllocation
PDSCH-TimeDomainResourceAllocation ::= SEQUENCE {
  k0                            INTEGER(0..32) OPTIONAL, -- Need S
    (PDCCH-TO-PDSCH TIMING, SLOT UNIT)
  mappingType                   ENUMERATED {typeA, typeB},
    (PDSCH MAPPING TYPE)
  startSymbolAndLength          INTEGER (0..127)
  (START SYMBOL AND LENGTH OF PDSCH)
}

TABLE 13

PUSCH-TimeDomainResourceAllocation information element

PUSCH-TimeDomainResourceAliocationList ::= SEQUENCE
(SIZE(1..maxNrofUL-Allocations)) OF PUSCH-TimeDomainResourceAllocation
PUSCH-TimeDomainResourceAllocation ::= SEQUENCE {
  k2                            INTEGER(0..32)    OPTIONAL, -- Need S
    (PDCCH-TOo-PUSCH TIMING, SLOT UNIT)
  mappingType                   ENUMERATED {typeA, typeB},
    (PUSCH MAPPING TYPE)
  startSymbolAndLength          INTEGER (0..127)
  (START SYMBOL AND LENGTH OF PUSCH)
}

The base station may notify one of the entries of Tables 12 and 13 of the time domain resource allocation information to the terminal through L1 signaling (e.g., DCI) (e.g., the entry may be indicated by a 'time domain resource allocation' field in the DCI). For example, the base station may notify one of the entries included in the PDSCH-TimeDomainResourceAllocationList Information element of the Table 12. Further, the base station may notify one of the entries included in the PUSCH-TimeDomainResourceAllocation Information element of the Table 13. The terminal may obtain the time domain resource allocation information for the PDSCH or the PUSCH based on the DCI received from the base station.

A method of measuring and reporting a channel state in a next generation mobile communication system will now be described in detail.

CSI may include channel quality information (CQI), a precoding matrix indicator (PMI), a CSI-RS resource indicator (CRI), an SS/PBCH block resource indicator (SSBRI), a layer indicator (LI), a rank indicator (RI), and/or an L1-reference signal received power (RSRP). A base station may control a time-and-frequency resource for CSI measurement and reporting of a terminal.

For the CSI measurement and reporting, the terminal may be given, through higher layer signaling, setting information for N (≥1) CSI reports (CSI-ReportConfig), setting information for M (≥1) RS transmission resources (CSI-ResourceConfig), and one or two pieces of trigger state list information (CSI-AperiodicTriggerStateList and CSI-SemiPersistentOnPUSCH-TriggerStateList).

In order to reduce power consumption of a terminal in a next generation mobile communication system, various transmission/reception related parameters may be adjusted by using layer 1 (L1) signaling. For example, the L1 signaling for reducing power consumption of the terminal may control a combination of at least one of parameters as shown in Table 14, as follows.

TABLE 14

PDCCH related configuration parameter (PDCCH monitoring period, the number of times of blind decoding, aggregation level (AL), monitoring occasion, PDCCH monitoring indicator, etc.)
BWP related configuration parameter (BWP index, bandwidth size of BWP, etc.)
CA related configuration parameter (CC index, CC activation or inactivation indicator, etc.)
DRX related configuration parameter (DRX period, DRX timer related parameter (onDurationTimer, InactivityTimer, HARQ-RTT-Timer, or RetransmissionTimer), etc.)
antenna related configuration information (number of layers, number of antenna ports, number of antenna panels, etc.)
time domain resource allocation related configuration information (PDCCH-to-PDSCH timing K0 or PDCCH-to-PUSCH timing K2)
HARQ timing related configuration information (PDSCH-to-HARQ timing)
CSI-RS configuration information
uplink power control information
other transmission/reception related configuration information The L1 signaling transmitted to reduce power consumption of the terminal may be referred to as a power saving signal (POSS).

The disclosure provides a method of configuring a POSS and a method of operating a base station and a terminal according to the method of configuring the POSS. For example, an embodiment of the disclosure provides a method, a monitoring configuration method for a POSS (e.g., a method of configuring a control region and a search space), a DCI structure and contents corresponding to the POSS, a method of monitoring the POSS, a method of monitoring a PDCCH when the terminal detects the POSS, a method of dynamically changing a period of the PDCCH by using the POSS, a PDCCH monitoring operation of the terminal when the configured POSS is not received, and a method of determining Condition 1 or Condition 2 related to a search space during POSS monitoring.

When a method of transmitting a POSS and a PDCCH monitoring method of a terminal provided by the disclosure are used, power consumption of the terminal according to a PDCCH monitoring may be minimized.

Embodiment 1

Embodiment 1 of the disclosure provides a method of transmitting/receiving a POSS in which a base station performs a configuration necessary to transmit a POSS to a terminal and notifies configuration information, and a method in which the terminal receives the configuration information for the POSS from the base station and performs monitoring on the POSS based on the configuration information.

A POSS may control a combination of at least one of parameters as shown in Table 15, as follows.

TABLE 15

PDCCH related configuration parameter (PDCCH monitoring period, the number of times of blind decoding, aggregation level (AL), monitoring occasion, PDCCH monitoring indicator, etc.)
BWP related configuration parameter (BWP index, bandwidth size of BWP, etc.)
CA related configuration parameter (CC index, CC activation or inactivation indicator, etc.)
DRX related configuration parameter (DRX period, DRX timer related parameter (onDurationTimer, InactivityTimer, HARQ-RTT-Timer, or RetransmissionTimer), etc.)
antenna related configuration information (number of layers, number of antenna ports, number of antenna panels, etc.)
time domain resource allocation related configuration information (PDCCH-to-PDSCH timing K0 or PDCCH-to-PUSCH timing K2)
HARQ timing related configuration information (PDSCH-to-HARQ timing)
CSI-RS configuration information
uplink power control information
other transmission/reception related configuration information For example, the POSS may indicate to perform PDCCH monitoring (which may be referred to as a wake-up signal (POSS) in an embodiment of the disclosure). In more detail, the base station may transmit the POSS to the terminal, and the terminal may perform monitoring on a PDCCH from a point of time when the POSS is detected.

The POSS may indicate not to perform PDCCH monitoring (which may be referred to as go-to-sleep signal (GTS) in an embodiment of the disclosure). In more detail, the base station may transmit the POSS to the terminal, and the terminal may not perform monitoring on the PDCCH for a specific period of time from a point of time when the POSS is detected.

The POSS may indicate to change configuration information for PDCCH monitoring. Configuration information for the PDCCH may be included in all or some of parameters for a control region of Table 7 or parameters about a search space of Table 8. The base station may transmit the POSS to the terminal, and the terminal may perform monitoring on the PDCCH by applying PDCCH configuration information indicated by the POSS from a point of time when the POSS is detected.

The POSS may indicate contents of a combination of at least one of various parameters as shown in Table 14. The terminal receiving the POSS may control transmission/reception parameters based on configuration information indicated by the POSS from a point of time when the POSS is detected.

Figure 6:
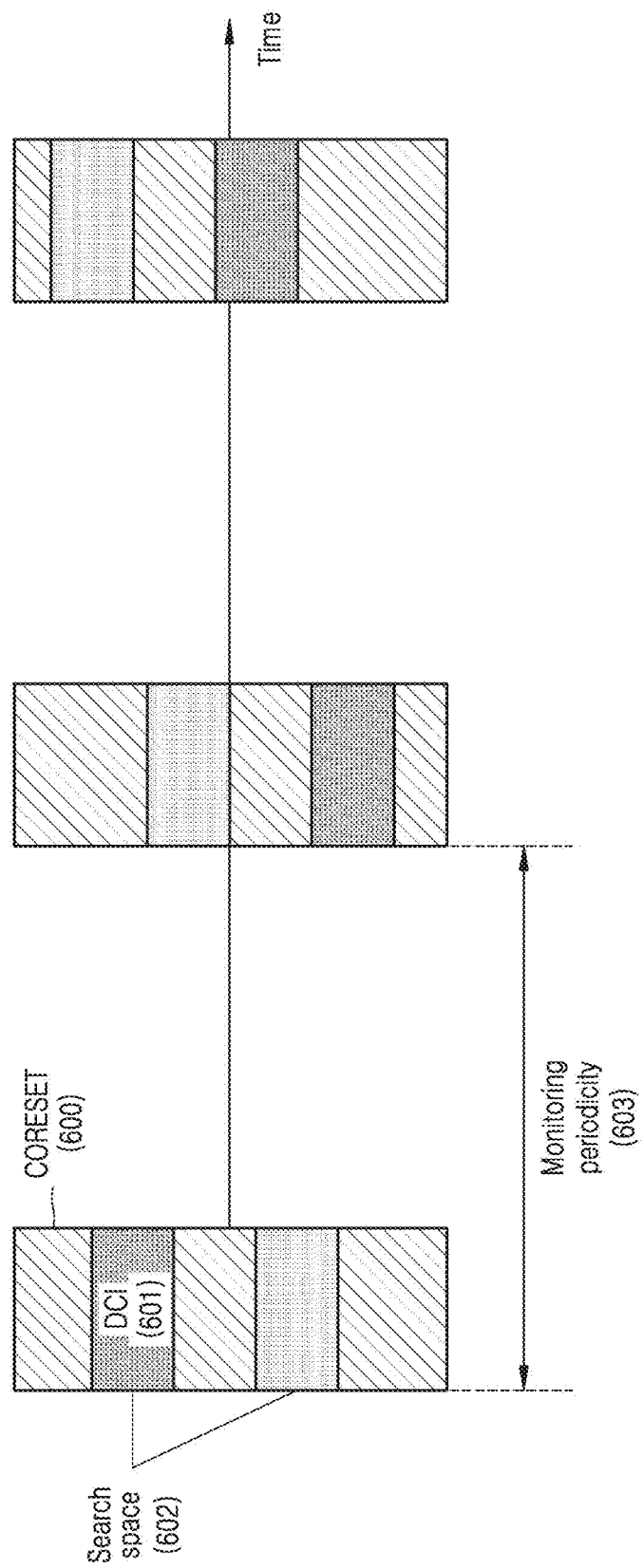
FIG. 6 illustrates transmission of a power saving signal (POSS) according to an embodiment.

FIG. 6 illustrates transmission of a POSS according to an embodiment.

Referring to FIG. 6, a base station may transmit DCI 601 corresponding to a POSS to a terminal. As shown in FIG. 6, the base station may configure a control region 600 and a search space 602 for transmitting the DCI 601 corresponding to the POSS in the terminal.

Embodiment 1-1

A method of configuring the control region 600 will be described as follows.

The control region 600 where the DCI 601 corresponding to the POSS may be transmitted may correspond to a control region (i.e., a control region whose control region ID is 0 or a control region #0) configured by the base station in the terminal through an MIB. That is, a search space for the DCI 601 corresponding to the POSS may always be associated with the control region #0. When a search space is associated with a control region, it may mean that the search space is defined in the associated control region (which may be configured by designating a value of a parameter Control-ResourceSetId in an RRC parameter SearchSpace iE for a search space of Table 8> as an ID of a control region to be associated).

Alternatively, the base station may configure the control region 600 where the DCI 601 corresponding to the POSS may be transmitted in the terminal through higher layer signaling, for example, RRC signaling. The base station may configure parameters of Table 7> in the terminal. That is, the search space for the DCI 601 corresponding to the POSS may always be associated with an arbitrary control region that is configured through RRC signaling.

Another method of configuring the control region 600 will be described as follows.

The control region where the DCI 601 corresponding to the POSS may be transmitted may exist only in a specific BWP. The control region 600 may be configured in an initial BWP configured through an MIB. The control region 600 may exist in an initial BWP configured through an SIB. The control region 600 may exist in a BWP corresponding to a default BWP from among BWPs configured through higher layer signaling, e.g., RRC signaling. In this case, the default BWP may refer to a BWP to which the terminal switches back when the terminal does not detect DCI for a period of time (bwp-InactivityTimer). The base station may configure a BWP for monitoring the control region 600 where the DCI 601 corresponding to the POSS may be transmitted in the terminal through higher layer signaling, e.g., RRC signaling. That is, the search space for the DCI 601 corresponding to the POSS may always be associated with a control region existing in a specific BWP.

Alternatively, the control region 600 where the DCI 601 corresponding to the POSS may be transmitted may exist in each BWP. That is, the search space for the DCI 601 corresponding to the POSS may be associated with a control region existing in an arbitrary BWP configured through RRC signaling.

Another method of configuring the control region 600 is as follows.

The control region 600 where the DCI 601 corresponding to the POSS may be transmitted may correspond to a control region configured as a common search space. That is, a search space type for the DCI 601 corresponding to the POSS may be associated with the control region configured as the common search space.

Alternatively, the control region 600 where the DCI 601 corresponding to the POSS may be transmitted may correspond to a control region configured as a UE-specific search space. That is, a search space type for the DCI 601 corresponding to the POSS may be associated with the control region configured as the UE-specific search space.

Another method of configuring the control region 600 is as follows.

A specific parameter from among configured parameters of the control region 600 where the DCI 601 corresponding to the POSS may be transmitted may be configured by using a specific value. For example, precoderGranularity from among parameters of Table 7> for the control region 600 may be configured by using allContiguousRBs (which may indicate that a DMRS of the control region is configured by using a wideband RS). When precoderGranularity is configured by using allContiguousRBs, the terminal may assume that the same precoding is applied to all DMRSs transmitted in continuous RBs in the control region.

Embodiment 1-2

As shown in FIG. 6, a base station may configure the search space 602 for transmitting the DCI 601 corresponding to a POSS in a terminal through higher layer signaling. For example, the base station may configure, in the terminal, parameters (i.e., a monitoring period and offset of a slot unit, a monitoring occasion of a symbol unit, the number of PDCCH candidates per AL, a search space type, and a DCI format) for a search space of Table 8.

A method in which the base station configures the search space 602 for monitoring the POSS in the terminal may include at least one method in which the base station configured a search space type of a search space from among the following methods.

Method 1

The base station may configure a search space type as a common search space (CSS), and a value of $Y\_(p,n^u_{s,f})$ from among parameters for determining a search space may correspond to 0. That is, DCI corresponding to the POSS may be transmitted to the common search space. The terminal may monitor the DCI corresponding to the POSS in the common search space.

Method 2

The base station may configure a search space type as a common search space (CSS) or a group common search space (GCSS), and a value of $Y\_(p,n^u_{s,f})$ from among parameters for determining a search space may be determined by using a group common RNTI (GC-RNTI). That is, DCI corresponding to the POSS may be transmitted to the group common search space. The terminal may monitor the DCI corresponding to the POSS in the group common search space.

Method 3

The base station may configure a search space type as a UE-specific search space (USS), and a value of $Y\_(p,n^u_{s,f})$ may correspond to a value that varies according to a time index and an identity of the terminal (an ID configured for the terminal by the base station or a C-RNTI). That is, DCI corresponding to the POSS may be transmitted to the UE-specific search space. The terminal may monitor the DCI corresponding to the POSS in the UE-specific search space.

A method in which the base station configures the search space 602 for monitoring the POSS in the terminal may include at least one method in which the base station configures a DCI format to be monitored in a search space from among the following methods.

Method 1

The base station may configure a specific DCI format (e.g., a DCI format 0-2 or 1-2 or a DCI format 3) defined to transmit the POSS to be monitored in the terminal. A DCI format for POSS may be scrambled by a POSS-RNTI. The terminal may receive a DCI format corresponding to the POSS assuming that the DCI format corresponding to the POSS is scrambled by the POSS-RNTI. That is, the DCI format corresponding to the POSS may be descrambled by the POSS-RNTI.

Method 2

The base station may configure a DCI format 0-0 or 1-0 that is scrambled by an RNTI corresponding to the POSS (e.g., a POSS-RNTI) to be monitored in the terminal.

When the terminal is given the POSS-RNTI, the terminal may monitor DCI that is scrambled by the POSS-RNTI for the DCI format 0-0 or 1-0.

Method 3

The base station may configure a DCI format 0-1 or 1-1 that is scrambled by an RNTI corresponding to the POSS-RNTI to be monitored in the terminal. When the terminal is given the POSS-RNTI, the terminal may monitor DCI that is scrambled by the POSS-RNTI for the DCI format 0-1 or 1-1.

Embodiment 1-2-1

A DCI format corresponding to a POSS may include the following fields:
- carrier indicator
- BWP indicator
- CSI request indicator
- PDCCH monitoring related configuration indicator (a PDCCH monitoring period 603 or related configuration, the number of times of blind decoding or related configuration, an aggregation level (AL), a monitoring occasion, and a PDCCH monitoring indicator)
- combination of at least one of transmission/reception related parameters existing in Table 15
- information $T_{gap}$ related to a point of time when configuration change contents indicated by the POSS are applied
- information $T_{duration}$ related to a duration for which configuration change contents indicated by the POSS are applied When the terminal receives the DCI format corresponding to the POSS, the terminal may apply a PDCCH monitoring related configuration indicated by DCI (or other transmission/reception related parameter related configuration) to a carrier indicated by a carrier indicator in the DCI format.

When the terminal receives the DCI format corresponding to the POSS, the terminal may apply a PDCCH monitoring related configuration indicated by DCI (or other transmission/reception related parameter related configuration) to a BWP indicated by a BWP indicator in the DCI format.

When the terminal receives the DCI format corresponding to the POSS, the terminal may apply a PDCCH monitoring related configuration indicated by DCI (or other transmission/reception related parameter related configuration) from a point of time indicated by $T_{gap}$ in the DCI format. For example, when a PDCCH through which the DCI format corresponding to the POSS is transmitted is received in a slot n, the terminal may apply configuration change contents from a slot n+T$_{gap}$|, and may perform PDCCH monitoring (or a related transmission/reception operation) according to a changed configuration.

When the terminal receives the DCI format corresponding to the POSS, the terminal may apply a PDCCH monitoring related configuration indicated by DCI (or other transmission/reception related parameter related configuration) from a point of time indicated by T$_{duration}$ in the DCI format. For example, when the PDCCH through which the DCI format corresponding to the POSS is transmitted is received in the slot n, the terminal may apply configuration change contents for a duration from the slot n+T$_{gap}$ to n+T$_{gap}$+T$_{duration}$−1|. The terminal may perform PDCCH monitoring (or a related transmission/reception operation) according to a changed configuration.

Embodiment 1-2-2

Embodiment 1-2-2 provides a method of aligning sizes of DCI formats, when DCI formats corresponding to a POSS of a terminal are monitored and the number of DCI formats having different sizes is equal to or greater than a specific number.

A next generation mobile communication system may limit the number of pieces of DCI having different sizes monitored by the terminal at a specific point of time to greater than or equal to a specific number, in order to reduce complexity according to DCI decoding of the terminal. For example, the next generation mobile communication system may routinely satisfy the following two conditions.

Condition 1
The terminal may monitor up to X pieces of DCI having different sizes per slot (e.g., X=4).

Condition 2
The terminal may monitor up to Y pieces of DCI having different sizes per slot for a specific RNTI. For example, the specific RNTI may refer to a C-RNTI, a CS-RNTI, a MCS-C-RNTI, or other UE-specific RNTI (e.g., Y=3).

A base station may appropriately adjust a DCI size to satisfy condition 1 and condition 2. The terminal may not expect a configuration of a DCI size that does not satisfy condition 1 and condition 2. A size of a frequency axis resource allocation field of a DCI format 0_0/1_0 monitored in a UE-specific search space may be determined to be a size of a BWP that is currently activated. However, when a size of the DCI format 0_0/1_0 monitored in the UE-specific search space is determined to be a size of the BWP that is currently activated and does not satisfy the conditions for limiting a DCI size, a size of the frequency axis resource allocation filed of the DCI format 0_0/1_0 may be determined to be a size of an initial BWP. That is, because a size of the DCI format 0_0/1_0 monitored in a common search space and a size of the DCI format 0_0/1_0 monitored in the UE-specific search space are identical, the number of pieces of DCI having different sizes may be reduced.

The DCI formats corresponding to the POSS may have sizes that are identical to or different than some of other DCI formats (e.g., a DCI format 0_0/1_0, a DCI format 0_1/1_1, and a DCI format 2_0/2_1/2_2/2_3). When the terminal monitors the DCI formats corresponding to the POSS and condition 1 or condition 2 is satisfied, the terminal may operate by using a combination of at least one of the following methods.

Method 1
When sizes of the DCI formats corresponding to the POSS may be aligned to be identical to sizes of other DCI formats X. For example, the DCI formats X may include the following DCI formats.
DCI format 0_0 or DCI format 1-0 monitored in a search space whose search space type is configured as a CSS
DCI format 0_0 or DCI format 1-0 monitored in a search space whose search space type is configured as a USS
DCI format 0_1 or DCI format 1_1
DCI format 2_0 or DCI format 2_1

When the terminal monitors the DCI formats corresponding to the POSS and condition 1 or condition 2 is not satisfied, the terminal may perform monitoring by assuming sizes of the DCI formats corresponding to the POSS by using Method 1.

Method 2
Sizes of the DCI format 0_1 and the DCI format 1_1 may be aligned to be identical.

By adding 0 to DCI having a small size through zero-padding from among the DCI format 0_1 and the DCI format 1_1, a size of the DCI format 0_1 or the DCI format 1_1 may be adjusted to a size of DCI having a large size. In more detail, when a size of the DCI format 0_1 is greater than a size of the DCI format 1_1, a size of the DCI format 1_1 may be adjusted to be identical to a size of the DCI format 0_1, by adding 0 to the DCI format 1_1 through zero-padding. When a size of the DCI format 1_1 is greater than a size of the DCI format 0_1, a size of the DCI format 0_1 may be adjusted to be identical to a size of the DCI format 1_1, by adding 0 to the DCI format 0_1 through zero-padding.

By truncating some bits of DCI having a large size from among the DCI format 0_1 and the DCI format 1_1, a size of the DCI format 0_1 or a size of the DCI format 1_1 may be adjusted to a size of DCI having a small size. For example, when a size of the DCI format 0_1 is greater than a size of the DCI format 1_1, a size of the DCI format 0_1 may be adjusted to be identical to a size of the DCI format 1_1, by truncating some bits of the DCI format 0_1. When a size of the DCI format 1_1 is greater than a size of the DCI format 0_1, a size of the DCI format 1_1 may be adjusted to be identical to a size of the DCI format 0_1, by truncating some bits of the DCI format 1_1.

A size of the DCI format 1_1 may be adjusted to a size of the DCI format 0_1. For example, when a size of the DCI format 0_1 is greater than a size of the DCI format 1_1, a size of the DCI format 1_1 may be adjusted to be identical to a size of the DCI format 0_1, by adding 0 to the DCI format 1_1 through zero-padding. When a size of the DCI format 0_1 is less than a size of the DCI format 1_1, a size of the DCI format 1_1 may be adjusted to be identical to a size of the DCI format 0_1, by truncating some bits of the DCI format 1_1.

A size of the DCI format 0_1 may be adjusted to a size of the DCI format 1_1. For example, when a size of the DCI format 11 is greater than a size of the DCI format 0_1, a size of the DCI format 0_1 may be adjusted to be identical to a size of the DCI format 1_1, by adding 0 to the DCI format 0_1 through zero-padding. When a size of the DCI format 1_1 is less than a size of the DCI format 0_1, a size of the DCI format 0_1 may be adjusted to be identical to a size of the DCI format 1_1, by truncating some bits of the DCI format 0_1.

When the terminal monitors the DCI formats corresponding to the POSS and condition 1 or condition 2 is not satisfied, the terminal may align sizes of the DCI format 0_1 and the DCI format 1_1 to be identical based on Method 2. The terminal may monitor the DCI format 0_1 and the DCI format 1_1 based on the aligned DCI sizes.

Method 3

The terminal may monitor the DCI formats corresponding to the POSS, and may not expect that condition 1 or condition 2 is not satisfied. That is, even when the terminal monitors the DCI formats corresponding to the POSS, the terminal may expect that a DCI format size always satisfies condition 1 or condition 2. To this end, the base station may appropriately configure sizes of the DCI formats corresponding to the POSS.

Embodiment 1-2-2 of the disclosure may be applied to not only an instance where the terminal monitors the DCI formats corresponding to the POSS but also an instance where the terminal monitors new DCI formats other than existing DCI formats (e.g., DCI formats 0_0, 0_1, 1_0, 1_1, 2_0, 2_1, 2_2, and 2_3) and condition 1 or condition 2 is not satisfied.

Embodiment 1-2-3

A base station may configure a DCI format 0_1 or a DCI format 1_1 scrambled by an RNTI corresponding to a POSS (e.g., a POSS-RNTI) to be monitored in a terminal. When the terminal is given the POSS-RNTI, the terminal may monitor DCI scrambled by the POSS-RNTI for the DCI format 0_1 or the DCI format 1_1.

The DCI format 0_1 or the DCI format 1_1 scrambled by the POSS-RNTI may include the following Field 1.

Field 1: combination of at least one of transmission/reception related parameter indicators existing in Table 15> or a PDCCH monitoring related configuration indicator (a PDCCH monitoring period, the number of times of blind decoding, an aggregation level (AL), a monitoring occasion, or a PDCCH monitoring indicator)

When the DCI format 0_1 or the DCI format 1_1 scrambled by the POSS-RNTI, some of existing fields in the DCI format 0_1 or DCI format 1_1 which are scrambled by the C-RNTI described in Table 4 and Table 6 may be replaced by Field 1. Alternatively, some bits of an existing field in the scrambled DCI format 0_1 or DCI format 1_1 may be reinterpreted with contents of [Field 1]. A BWP indicator field in the DCI format 0_1 or the DCI format 1_1 may be replaced with [Field 1]. In another embodiment of the disclosure, N bits from among most significant bits (MSBs) and least significant bits (LSBs) in a frequency domain allocation information field in the DCI format 0_1 or the DCI format 1_1 may be reinterpreted with contents of Field 1.

Contents indicated by an indicator of Field 1 may be configured by the base station in the terminal through higher layer signaling. For example, the base station may configure PDCCH monitoring related configuration parameters (or transmission/reception parameters existing in Table 15) as $2^N-1$ entries in the terminal through higher layer signaling, and may notify the terminal by using N bits of Field 1.

The base station may configure $2^N-1$ entries including a search space superset including one or more search space configurations in the terminal. Also, one entry may be selected and indicated from among search space supersets configured by using an indicator of N bits.

Table 16 below shows an example where configuration information for a search space is indicated by an indicator of 2 bits A search space #X may refer to a search space whose search space identifier is set to X, from among search spaces configured in Table 8.

TABLE 16

| Indicator value of [Field 1] | Search space superset configured through higher layer signaling |
| --- | --- |
| 00 | {Search space #1} |
| 01 | {Search space #1, search space #2} |
| 10 | {Search space #1, search space #2, search space #3} |
| 11 | {Search space #2, search space #4} |

The terminal may perform monitoring on search spaces indicated by [Field 1] received from the base station. When the terminal receives a value indicated by '01' based on Table 16, the terminal may perform monitoring search space #1 and search space #2.

The base station may configure $2^N-1$ entries including a superset including a combination of transmission/reception related parameters existing Table 15 in the terminal. The base station may select and indicate one from among entries configured by using an indicator of N bits. Table 17 below shows an example where an indicator of 1 bit is used, and a combination of four parameters (PowerSavingMode #1, PowerSavingMode #2, PowerSavingMode #3, and PowerSavingMode #4) may be configured in total through higher layer signaling.

TABLE 17

| Indicator value of [Field 1] | Entry configured through higher layer signaling |
| --- | --- |
| 00 | PowerSavingMode#1 (configured by higher layer) |
| 01 | PowerSavingMode#2 (configured by higher layer) |
| 10 | PowerSavingMode#3 (configured by higher layer) |
| 11 | PowerSavingMode#4 (configured by higher layer) |

PowerSavingMode #X (X=1, 2, 3, or 4) may refer to configuration information for various transmission/reception related parameters (a combination of at least one of parameters of Table 15). That is, PowerSavingMode #X may be configured as follows.

PowerSavingMode #X={PDCCH related configuration #X, BWP related configuration #X, CA related configuration #X, discontinuous reception (DRX) related configuration #X, antenna related configuration #X, time domain resource allocation related configuration #X, hybrid automatic repeat request (HARQ) timing related configuration #X, CSI-RS configuration #X, uplink power control configuration #X, other transmission/reception related configuration information #X}

The terminal may control or change a related transmission/reception operation by applying transmission/reception related parameters indicated by Field 1 received from the base station. For example, when the terminal receives a value indicated by '01' based on Table 17, the terminal may perform transmission/reception based on transmission/reception parameters corresponding to PowerSavingMode #2.

Embodiment 2

A base station may notify various configuration information for a POSS to a terminal, through higher layer signaling (see embodiment 1). The terminal receiving the configuration information for the POSS may perform monitoring on the POSS. Embodiment 2 provides a method in which the base station activates (triggers) the terminal to perform monitoring on the POSS. One or more of the following embodiments of the disclosure may be combined and implemented.

Embodiment 2-1

A base station may notify configuration information for a POSS to a terminal, through higher layer signaling (see embodiment 1). The terminal receiving the configuration information for the POSS from the base station may perform monitoring on the POSS.

Embodiment 2-2

A base station may notify configuration information for a POSS to a terminal, through higher layer signaling. The base station may additionally transmit a message for activating a POSS monitoring operation as well as the configuration information for the POSS to the terminal. After receiving the message for activating the POSS monitoring operation, the terminal may perform monitoring on the POSS according to the configuration information for the POSS notified by the base station.

Figure 7:
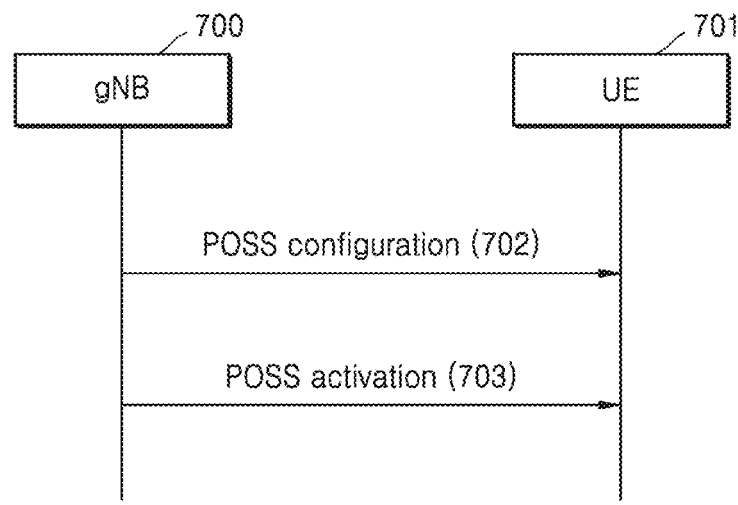
FIG. 7 illustrates a POSS monitoring method according to embodiment 2-2.

FIG. 7 illustrates a POSS monitoring method of a gNB 700 and a UE 701 according to embodiment 2-2.

Referring to FIG. 7, in step 702, the gNB 700 may notify configuration information for a POSS to the UE 701, through higher layer signaling.

In step 703, the gNB 700 may additionally transmit a message for activating POSS monitoring to the UE 701, through higher layer signaling or L1 signaling.

In step 702, the UE 701 may receive the configuration information for the POSS from the gNB 700. In step 703, the UE 701 may additionally receive the message for activating POSS monitoring from the gNB 700. In step 703, the terminal 701 receiving the message for activating POSS monitoring may perform monitoring on the POSS according to the configuration information for the POSS notified by the base station in step 702.

Embodiment 2-2 may allow the base station to adjust the terminal to perform monitoring on a POSS at a desired point of time, by additionally introducing a message for activating POSS monitoring.

Embodiment 2-3

A base station may notify configuration information for a POSS to a terminal, through higher layer signaling. The terminal may transmit a message for requesting activation of POSS monitoring to the base station. The base station receiving the message for requesting activation of POSS monitoring from the terminal may activate POSS monitoring of the terminal by additionally transmitting a message for activating POSS monitoring.

Figure 8:
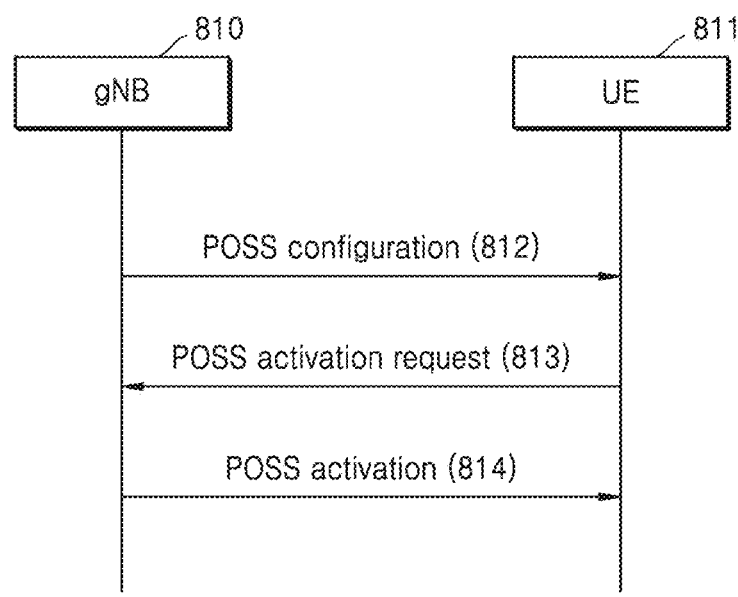
FIG. 8 illustrates a POSS monitoring method according to embodiment 2-3.

FIG. 8 illustrates a POSS monitoring method according to embodiment 2-3. That is, FIG. 8 illustrates operations of a gNB 810 and a UE 811 according to Embodiment 2-3.

Referring to FIG. 8, in step 812, the gNB 810 may notify configuration information for a POSS to the UE 811, through higher layer signaling.

In step 813, the UE 811 may transmit a message for requesting activation of POSS monitoring to the gNB 810, through higher layer signaling or L1 signaling.

In step 814, the gNB 810 may additionally transmit a message for activating POSS monitoring to the UE 811, through higher layer signaling or L1 signaling. In step 814, the terminal receiving the message for activating POSS monitoring may perform monitoring on the POSS according to the configuration information for the POSS notified by the base station in step 812.

Embodiment 2-3 may adjust the terminal to perform monitoring on a POSS from a desired point of time, by introducing an operation in which the terminal transmits a message for requesting activation of POSS monitoring to the base station.

When embodiment 2-3 is performed, step 814 of FIG. 8 may be omitted.

Embodiment 2-4

A base station may notify configuration information for a POSS to a terminal, through higher layer signaling. The base station may additionally configure a time value (referred to as POSS-InactivityTimer) corresponding to a timer for the POSS through higher layer signaling in the terminal. The terminal may determine whether monitoring is performed on the POSS based on the configured time value POSS-InactivityTimer. That is, when DCI is not detected for a specific period of time corresponding to POSS-InactivityTimer (i.e., when the timer expires), the terminal may perform monitoring on the POSS.

Figure 9:
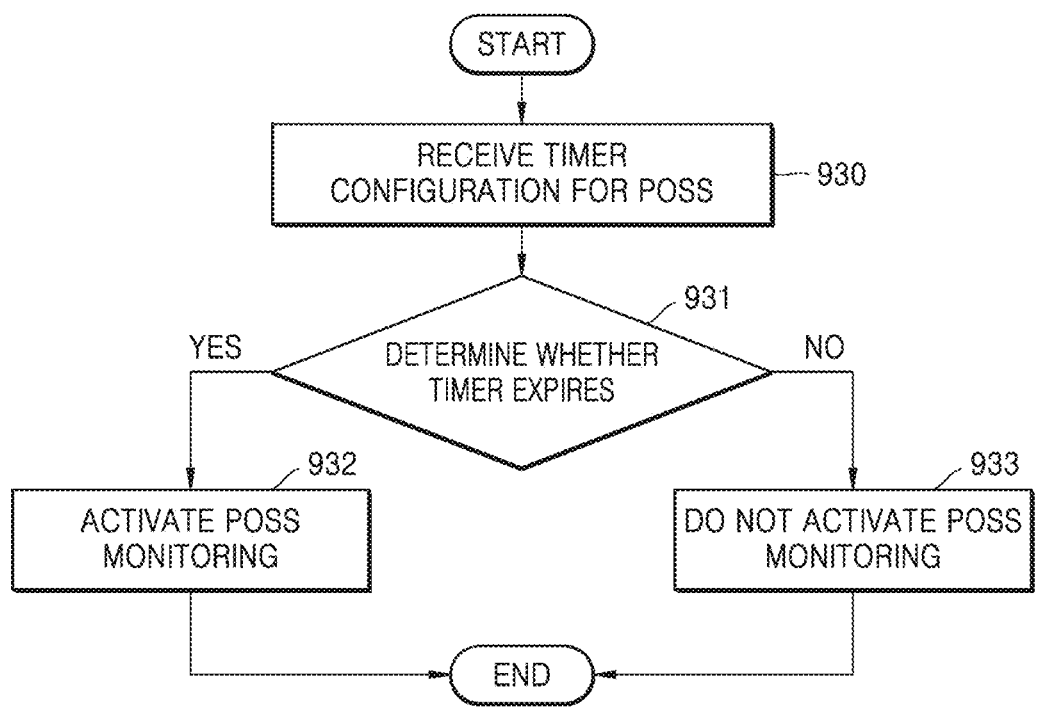
FIG. 9 illustrates a POSS monitoring method according to embodiment 2-4.

FIG. 9 illustrates a POSS monitoring method of a terminal according to embodiment 2-4.

Referring to FIG. 9, in step 930, the terminal may receive timer configuration information, that is, a POSS-InactivityTimer value, through higher layer signaling from a base station. The terminal receiving the POSS-InactivityTimer value through higher layer signaling may run the timer. When DCI is not detected, the terminal may increase a timer value at every specific time interval (e.g., 1 ms).

In step 931, the terminal may determine whether the timer expires (that is, whether the executed timer reaches the configured InactivityTimer value). When the timer expires, the terminal may perform step 932. When the timer does not expire, the terminal may perform step 933.

In step 932, the terminal may activate POSS monitoring. That is, the terminal may start to perform POSS monitoring.

In step 933, the terminal may not activate POSS monitoring. That is, when the timer does not expire, the terminal may not perform POSS monitoring.

In embodiment 2-4, by adjusting monitoring of the terminal for a POSS based on a timer, the base station may not transmit a PDCCH to the terminal when there is no or little traffic to be transmitted/received to/from the terminal. Accordingly, when the PDCCH is not detected for a specific period of time or more, the terminal may minimize unnecessary PDCCH monitoring, by performing monitoring on the POSS (that is, operating in a low power mode).

Embodiment 2-5

A base station may notify configuration information for a POSS to a terminal through higher layer signaling. In this case, the base station may configure the POSS in a specific BWP through higher layer signaling in the terminal. That is, the POSS may be associated with the specific BWP. The specific BWP associated with the POSS may be referred to as a first BWP. When the first BWP is activated by a BWP activation message or a BWP change message, the terminal may start monitoring on the POSS existing in the first BWP.

Figure 10:
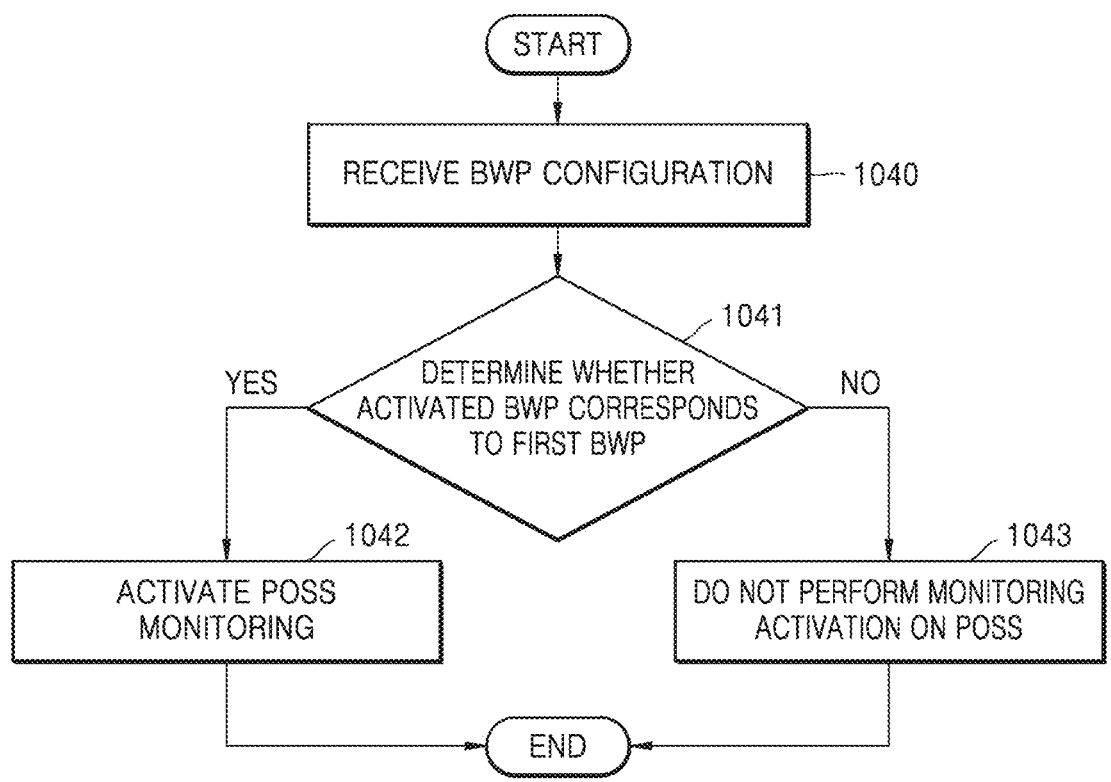
FIG. 10 illustrates a POSS monitoring method according to embodiment 2-5.

FIG. 10 illustrates a POSS monitoring method of a terminal according to embodiment 2-5.

Referring to FIG. 10, in step 1040, the terminal may receive configuration information for a BWP through higher layer signaling from a base station. In this case, the base station may configure a POSS in a first BWP. In this case, the first BWP may correspond to at least one of the following BWPs.
- An initial BWP.
- A default BWP.
- A BWP configured as a narrow bandwidth (whose bandwidth size is less than X RB).
- An arbitrary BWP from among configured BWPs.

In step 1041, the terminal may determine whether activated BWP corresponds to the first BWP. The first BWP may be activated by using higher layer signaling or L1 signaling or a timer-based method (e.g., when the first BWP corresponds to a default BWP, an operation of activating the default BWP when a timer expires). In more detail, a method of activating a BWP may follow the following operations.

- The base station may configure one or more BWPs through higher layer signaling in the terminal, and may indicate a BWP to be activated through higher layer signaling. A BWP first activated by RRC may be indicated by FirstActiveDownlinkBWP/FirstActiveUplinkBWP. The terminal may activate the BWP indicated by RRC from among the configured BWPs.
- The base station may configure one or more BWPs through higher layer signaling. The base station may indicate a BWP to be activated by using a BWP indicator existing in DCI, that is, through LI signaling, to the terminal. The terminal may activate a BWP corresponding to an index indicated by the BWP indicator. When the BWP index indicated by the BWP indicator is different from an index of a BWP that is currently activated, the terminal may activate the BWP indicated by the BWP indicator.
- The base station may configure one or more BWPs through higher layer signaling in the terminal, and may configure one of the BWPs as a default BWP. The base station may configure a timer BWP-InacitivityTimer for the default BWP in the terminal. The terminal operating in a BWP other than the default BWP may change a BWP to the default BWP when DCI is not detected for a specific period of time in the BWP that is currently activated (that is, when the timer BWP-InactivityTimer expires). When the activated BWP corresponds to the first BWP, the terminal may perform step 1042. When the activated BWP does not correspond to the first BWP, the terminal may perform step 1043.

In step 1042, the terminal may activate POSS monitoring. That is, when the first BWP is activated, the terminal may start to perform monitoring on the POSS.

In step 1043, the terminal does not perform monitoring activation on the POSS.

That is, when the first BWP is not activated, the terminal does not perform monitoring on the POSS.

In embodiment 2-5, the base station may configure a POSS in a BWP having a relatively narrow bandwidth in the terminal. Accordingly, when the terminal monitors the POSS, the terminal may operate in a narrow BWP, thereby realizing a reduction in power consumption of the terminal.

Embodiment 2-6

A base station may notify configuration information for a POSS to a terminal through higher layer signaling. The base station may additionally configure a time value (referred to as POSS-InactivityTimer) corresponding to a timer for the POSS through higher layer signaling in the terminal. The terminal may determine whether monitoring is performed on the POSS based on POSS-InactivityTimer and BWP-InacitivityTimer. A timer used to determine whether monitoring is performed on the POSS may be defined as InactivityTimer=min(POSS-InactivityTimer, BWP-InactivityTimer). In this case, min(a,b) may refer to a function that outputs an equal or lesser value from among a and b. The terminal may perform monitoring on the POSS, when DCI is not detected for a specific period of time corresponding to InactivityTimer (i.e., when the timer expires).

Embodiment 3

Embodiment 3 provides a method of controlling a monitoring period for a PDCCH by using a POSS.

A terminal may be given one or more search spaces from a base station. A period or a monitoring occasion of each search space may be controlled by using the POSS. To this end, for example, the following information may be included in a DCI format or a field corresponding to the POSS.
- scaling factor $\alpha$ for a PDCCH monitoring period When the terminal receives the scaling factor $\alpha$ for the monitoring period from the POSS, the terminal may change or adjust monitoring periods of the configured search spaces, in consideration of the received scaling factor $\alpha$. The following embodiments of the disclosure provide a method of changing a PDCCH monitoring period based on a scaling factor.

Embodiment 3-1

A terminal may apply scaling for a slot unit monitoring period of a preconfigured search space based on a received value $\alpha$. For example, when a monitoring period of a specific search space is set to T slots and $\alpha$=A is received, the terminal may change the slot unit monitoring period of the search space to $^{A \cdot T}$ and may apply the changed slot unit monitoring period. For example, as shown in FIG. 11, a monitoring configuration may be changed.

Figure 11:
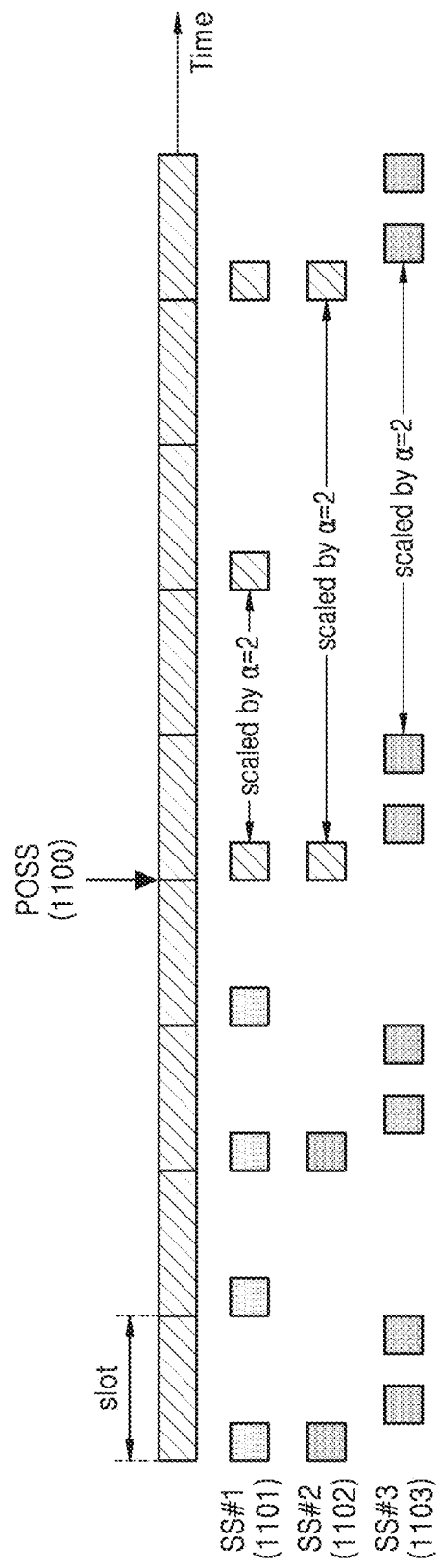
FIG. 11 illustrates a method of changing a physical downlink control channel (PDCCH) monitoring configuration according to an embodiment.

FIG. 11 illustrates a method of changing a PDCCH monitoring configuration according to a POSS according to an embodiment.

Referring to FIG. 11, when slot unit monitoring periods of search space #1 (SS #1) 1101 and search space #2 (SS #2) 1102 are respectively set to one slot and two slots and a terminal receives $\alpha$=2 from a POSS 1100, the terminal may change a slot unit monitoring period of search space #1 1101 to 2 slots and a slot unit monitoring period of search space #2 1102 to 4 slots and may apply the changed slot unit monitoring periods. The terminal may monitor the search spaces based on the changed monitoring periods.

When $\alpha$=1, the terminal may maintain slot unit monitoring periods that are previously set without changing monitoring period changes of the search spaces.

When $\alpha$=0, the terminal may not perform and may skip monitoring on the configured search spaces.

When $0<\alpha<1$, the terminal may change a monitoring period of a search space to a monitoring period of a symbol unit. When a slot unit monitoring period of a configured search space is T slots and the terminal receives $\alpha$=A, a symbol-unit monitoring period $T_{sym}$ may be calculated according to Equation [2], as follows.

$$T_{sym} = \left\lfloor \frac{T}{A} \cdot N_{symb}^{slot} \right\rfloor \text{ or } \left\lceil \frac{T}{A} \cdot N_{symb}^{slot} \right\rceil \quad [2]$$

In Equation [2], $\lfloor X \rfloor$ may denote a function that outputs a largest integer smaller than X, and $\lceil X \rceil$ may denote a function that outputs a smallest integer greater than X.

When $0<\alpha<1$, the terminal may determine a corresponding indicator as an error. That is, the terminal may expect that $\alpha=0$ or $\alpha>1$.

Embodiment 3-2

Monitoring occasion information (monitoringSymbolsWithinSlot) of a symbol unit within a slot from among configured parameters for a search space configured through higher layer signaling may be configured in a terminal (see Table 8).

For example, bitmap information about a symbol to be monitored from among 14 symbols within a slot may be configured in the terminal. When a monitoring occasion of a symbol unit in a specific search space is configured, a configured monitoring pattern within a slot may be repeated in every configured slot unit cycle.

A combination of at least one of the following methods may be used as a method in which the terminal changes a monitoring period based on a value $\alpha$ received by using a POSS, for a search space (referred to as search space A) where a monitoring occasion of a symbol unit and a monitoring period of a slot unit are configured from among search spaces configured in the terminal.

Method 1

When the terminal receives the POSS, the terminal may not perform monitoring on the search space A. Alternatively, when a value $\alpha$ is received from the POSS and $\alpha>1$ or $\alpha=0$, the terminal may not perform monitoring on the search space A.

Method 2

Irrespective of a value $\alpha$ indicated by the POSS, the terminal may maintain a monitoring configuration of the search space A without changing the monitoring configuration of search space A. That is, the terminal may apply a PDCCH monitoring period change operation based on the value a indicated by the POSS to only search spaces other than a search space corresponding to search space A.

Method 3

When the terminal receives a value $\alpha$ indicated by the POSS, the terminal may maintain a symbol unit monitoring occasion pattern within a slot of search space A and may change a monitoring period of a slot unit based on the received value a. In this case, embodiment 3-1 may be applied to a method of changing the monitoring period of the slot unit for search space A.

FIG. 11 illustrates an example where a symbol unit monitoring occasion is configured in search space #3 (SS #3) 1103 (2 occasions are configured per slot in the example of FIG. 11), and a slot unit monitoring period is set to 2 slots. Accordingly, search space #3 1103 may correspond to search space A. The terminal may change a slot unit monitoring period of search space #3 1103 from 2 slots to 4 slots, based on $\alpha=2$ received from the POSS 1100. The terminal may maintain a monitoring occasion pattern of a symbol unit within a slot of search space #3 1103.

The method of changing a monitoring period configuration may be applied only when $\alpha$ is received by the terminal from the POSS and $\alpha>1$.

Embodiment 3-3

A method corresponding to a combination of at least one of the following methods may be applied as a method in which a terminal changes a monitoring operation for a PDCCH by using a POSS (or a method in which the terminal changes a value of a transmission/reception parameter).

Method 1

Irrespective of a point of time when the terminal receives a POSS, the terminal may change a corresponding configuration by applying configuration change contents received by using the POSS to a value of a parameter of a search space configured through higher layer signaling.

For example, when a value of a specific parameter of a search space configured through higher layer signaling is set to A and a value of a scaling factor indicated by the POSS is $\alpha$, the terminal may change the value of the parameter of the search space to $\alpha \cdot A$ and may apply the changed value of the parameter. The PDCCH related parameter value A that may be adjusted by a scaling factor indicated by the POSS may include the following parameter set values.

slot unit monitoring period
symbol unit monitoring occasion within a slot
the number of PDCCH candidates per aggregation level (or the total number of PDCCH candidates)
monitoring length (corresponding to a parameter duration of Table 8)

The scaling factor $\alpha$ indicated by the POSS may correspond to a scaling factor that adjusts the following PDCCH related parameters.

scaling factor for the slot unit monitoring period
scaling factor for the symbol unit monitoring occasion within a slot
scaling factor for the number of PDCCH candidates per aggregation level (or the total number PDCCH candidates)
scaling factor for the monitoring length (corresponding to a parameter duration of Table 8)

For example, when a monitoring period of a slot unit of a search space is set to T slots and $\alpha$ (=A) is received, the terminal may change the slot unit monitoring period of the search space to $A \cdot T$ and may apply the changed slot unit monitoring period. That is, when the terminal changes a configuration of a search space based on embodiment 3-1 and embodiment 3-2, a value $\alpha$ that is received may be applied to a slot unit monitoring period or a symbol unit monitoring occasion value of the search space configured through higher layer signaling.

Method 2

The terminal may change a configuration, by applying received configuration change contents (e.g., a value $\alpha$) received by using a POSS to a value of a PDCCH parameter (or a transmission/reception parameter) which the terminal assumes at a previous point of time.

For example, when the terminal operates by using A as a value of a specific parameter of a search space at a specific point of time, e.g., a slot n, and a value of a scaling factor indicated by the POSS is $\alpha 1$, the terminal may change the value of a parameter of the search space to $A1 = \alpha 1 \cdot A$ and may apply the changed value of the parameter. Later, when a value of a scaling factor value indicated by the POSS is $\alpha 2$, the terminal may change the value of the parameter of the search space to $A2 = \alpha 2 \cdot A1 = \alpha 2 \cdot \alpha 1 \cdot A$ and may apply the changed value of the parameter. That is, configuration change contents received by using the POSS in method 2 may be accumulated and applied over time.

The PDCCH related parameter value A that may be adjusted by a scaling factor indicated by the POSS may include the following parameter set values.
- slot unit monitoring period
- symbol unit monitoring occasion within a slot
- the number of PDCCH candidates per aggregation level (or the total number of PDCCH candidates)
- monitoring length (corresponding to a parameter duration of Table 8)

The scaling factor α indicated by the POSS may correspond to a scaling factor that adjusts the following PDCCH related parameters.
- scaling factor for the slot unit monitoring period
- scaling factor for the symbol unit monitoring occasion within a slot
- scaling factor for the number of PDCCH candidates per aggregation level (or the total number of PDCCH candidates)
- scaling factor for the monitoring length (corresponds to a parameter duration of Table 8)

As a specific example, when the terminal receives a value α (=A) by using a POSS in a slot n and a monitoring period of a search space before the POSS is received is T slots, the terminal may change the monitoring period of the search space after receiving the POSS to $T'=A \cdot T$| and may apply the changed monitoring period. When the terminal receives a value α (=B) by using the POSS in a slot m (>n), the terminal may change the monitoring period of the search space to $B \cdot T'=B \cdot A \cdot T$ and may apply the changed monitoring period. That is, configuration change contents received by using the POSS in method 2 may be accumulated and applied over time.

The above method may also be applied even when the POSS indicates a scaling factor R for the number of PDCCH candidates per aggregation level (or the number of blind decoding instances). That is, the method may also be applied even when the POSS indicates a scaling factor γ for the number of search space blind decoding instances.

Embodiment 3-4

A terminal may apply a PDCCH monitoring configuration change based on a POSS to all search spaces configured in the terminal.

The terminal may apply a PDCCH monitoring configuration change based on the POSS to a remaining search space other than a search space configured to monitor the POSS from among the search spaces configured in the terminal.

The terminal may apply a PDCCH monitoring configuration change based on the POSS to a search space configured as a UE-specific search space other than a search space configured as a common search space from among the search spaces configured in the terminal.

The terminal may apply a PDCCH monitoring configuration change based on the POSS to a remaining search space other than a search space configured to monitor the POSS and a common-search space from among the search spaces configured in the terminal.

Embodiment 4

A terminal may be configured by a base station to monitor a POSS by using the above method, and may perform monitoring on the POSS. In this case, the terminal may or may not receive the POSS in an occasion configured to monitor the POSS.

When the terminal successfully receives the POSS, the terminal may change or adjust a configuration for a PDCCH (or other various transmission/reception related parameters) according to contents indicated by the POSS as in the above method, and then may perform monitoring on the PDCCH based on the changed configuration.

When the terminal does not successfully receive the POSS, there may be a different understanding about the configuration for the PDCCH (or other various transmission/reception related parameters) between the base station and the terminal. For example, the terminal may perform a monitoring operation on the PDCCH based on current PDCCH configuration #1, and when the base station transmits the POSS for changing to PDCCH configuration #2 to the terminal and the terminal does not successfully receive the POSS, the terminal may still perform a monitoring operation on the PDCCH based on PDCCH configuration #1. In contrast, the base station may transmit the PDCCH based on PDCCH configuration #2. In this case, transmission/reception of the PDCCH between the base station and the terminal may not be smoothly performed.

In order to solve this problem, embodiment 4 provides a method of transmitting/receiving a PDCCH between the base station and the terminal in case the terminal does not successfully receive a POSS.

The terminal may be given one or more search space sets from the base station, which one or more search space sets may be defined as a "first search space". The "first search space" may be defined as a configuration that is not changed by a POSS. When search space #1 and search space #2 are configured in the terminal, search space #1 is a "first search space" and the terminal receives a POSS, configuration change contents for a PDCCH indicated by the POSS may not be applied to search space #1 corresponding to the "first search space" and may be applied only to search space #2 other than the "first search space". As a result, only a configuration of search space #2 may be changed based on the POSS. In this case, even when the terminal does not successfully receive the POSS, the same understanding about search space sets corresponding to "first search space" may be maintained between the base station and the terminal, and thus the terminal may receive the PDCCH from the base station by using the search space sets corresponding to the "first search space".

The "first search space" may correspond to a combination of at least one of the following characteristics.
- search space set whose search space type is configured as a common search space
- a search space set configured by a lowest (or highest) index
- search space set configured by an index set to 0
- a search space set (configured to be monitored in a control region) associated with the control region configured by a lowest (or highest) index
- search space set monitored in a control region configured by an index set to 0
- search space set (configured to be monitored in a BWP) associated with the BWP configured by a lowest (or highest index
- search space set monitored in a BWP configured in a default BWP (e.g., defaultDownlinkBWP or a BWP configured by defaultDownlinkBWP-Id) through higher layer signaling (e.g., RRC) (defaultDownlinkBWP may correspond a fallback BWP for performing a change when the terminal does not receive the PDCCH for a specific duration defined by using a timer)

search space set monitored in a BWP configured as firstActiveDownlinkBWP through higher layer signaling (firstActiveDownlinkBWP may correspond to a BWP that is first activated through higher layer signaling by the base station)

search space set configured to monitor the POSS search space set configured or designated as a "first search space" by the base station Embodiment 5

A terminal may be configured by a base station to monitor a POSS by using the above method, and the terminal may perform monitoring on the POSS. In this case, a combination of at least one of the following methods may be used as a method in which the terminal performs monitoring on a search space set configured to monitor the POSS and other search space sets.

Method 1

The terminal may perform monitoring only on a search space set configured to monitor a POSS at a specific point of time. When the POSS is successfully received, for a specific duration $T_{duration}$ after a specific time ($T_{gap} \geq 0$) elapses since a point of time when the POSS is detected, the terminal may perform monitoring on other search space sets by applying a configuration change for a PDCCH based on contents indicated by the detected POSS.

Method 2

The terminal may perform monitoring on a search space set configured to monitor a POSS at a specific point of time and on other search space sets. When the POSS is successfully received, for a specific duration $T_{duration}$ after specific time $T_{gap}$ elapses since a point of time when the POSS is detected, the terminal may perform monitoring on other search space sets by applying a configuration change for a PDCCH based on contents indicated by the detected POSS.

Method 3

The terminal may not perform monitoring on a search space set for a POSS for $T_{duration}$.

Method 4

The terminal may continuously perform monitoring on a POSS for $T_{duration}$. When the POSS is detected, the terminal may control a monitoring operation for a PDCCH based on configuration information included in the newly detected POSS. In more detail, the terminal may detect a first POSS, and may perform monitoring on the PDCCH and monitoring on the POSS for a duration $T_{duration}$ after $T_{gap}$. When the terminal detects a second POSS for the duration $T_{duration}$, the terminal may change configuration information-1 indicated by the first detected POSS (e.g., various pieces of configuration information that may be indicated by the POSS) to configuration information-2 indicated by the second detected POSS and may newly apply the changed configuration information. By using the method, a monitoring operation of the terminal for the PDCCH may be more dynamically controlled.

Method 5

The base station may configure or indicate whether monitoring is to be performed on a POSS within $T_{duration}$ through higher layer signaling or L1 signaling in or to the terminal. The terminal may be configured or indicated whether monitoring is to be performed on the POSS within $T_{duration}$ through higher layer signaling or L1 signaling by or from the base station, and may determine whether to monitor the POSS according to a notification of the base station.

Method 6

The terminal may implicitly determine whether monitoring is to be performed on a POSS within $T_{duration}$ based on configuration information for the POSS (e.g., a POSS monitoring period, $T_{duration}$, etc.).

For example, when the POSS monitoring period is greater than a pre-selected or configured threshold value, the terminal may not perform monitoring on the POSS within $T_{duration}$. When the POSS monitoring period is less than a pre-selected or configured threshold value, the terminal may not perform monitoring on the POSS within $T_{duration}$. When $T_{duration}$ is less than a pre-selected configured threshold value, the terminal may not perform monitoring on the POSS within $T_{duration}$. When $T_{duration}$ is greater than a pre-selected configured threshold value, the terminal may not perform monitoring on the POSS within $T_{duration}$.

Method 7

A monitoring occasion of a POSS may be aligned with a time including $T_{gap}$ and $T_{duration}$. For example, a monitoring period of the POSS and $T_{duration}$ may be identical. That is, the terminal may not expect that there is an additional monitoring occasion for the POSS for a duration (e.g., $T_{duration}$) to which a configuration change indicated by the POSS is applied. When the terminal detects the POSS in a specific monitoring occasion, the terminal may perform monitoring on other search space sets by applying configuration change contents for a PDCCH indicated by the POSS for a duration corresponding to a next monitoring occasion for the POSS.

Method 8

The terminal may always monitor search space sets configured as a common search space irrespective of whether monitoring is performed on a POSS.

Method 9

The terminal may perform monitoring by maintaining a configuration configured through conventional higher layer signaling for search space sets configured as a common search space irrespective of contents indicated by a received POSS.

The above embodiments may be combined and implemented.

Figure 12:
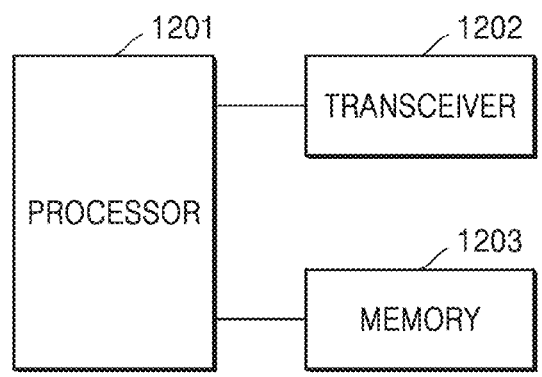
FIG. 12 is a block diagram illustrating an internal structure of a terminal according to an embodiment.

FIG. 12 is a block diagram illustrating a structure of a terminal according to an embodiment.

Referring to FIG. 12, the terminal may include a processor 1201, a transceiver 1202, and a memory 1203. However, elements of the terminal are not limited thereto. For example, the terminal may include elements more or fewer than those illustrated in FIG. 12. In addition, the processor 1201, the transceiver 1202, and the memory 1203 may be implemented as one chip.

The transceiver 1202 may transmit/receive a signal to/from the base station. The signal may include control information and data. To this end, the transceiver 1202 may include an RF transmitter that up-converts and amplifies a frequency of a transmitted signal and an RF receiver that performs low-noise amplification on a received signal and down-converts a frequency. The transceiver 1202 may receive a signal through a wireless channel, may output the signal to the processor 1201, and may transmit a signal output from the processor 1201 through the wireless channel.

The memory 1203 may store a program and data necessary to operate the terminal. The memory 1203 may store control information or data included in a signal transmitted/received by the terminal. The memory 1203 may include a storage medium such as a read-only memory (ROM), a random-access memory (RAM), a hard disk, a compact disc-ROM (CD-ROM), or a digital versatile disk (DVD), or a combination of storage media. The memory 1203 may include a plurality of memories. The memory 1203 may store a program for a POSS transmission/reception method of the terminal and a PDCCH monitoring control operation according to the POSS transmission/reception method.

The processor 1201 may control a series of processes so that the terminal operates according to the above embodiments. For example, the processor 1201 may differently control the POSS transmission/reception method of the terminal and the PDCCH monitoring control operation according to the POSS transmission/reception method according to embodiments. The processor 1201 may include a plurality of processors, and may differently control the POSS transmission/reception method of the terminal and the PDCCH monitoring control operation according to the POSS transmission/reception method according to embodiments of the disclosure, by executing the program stored in the memory 1203.

Figure 13:
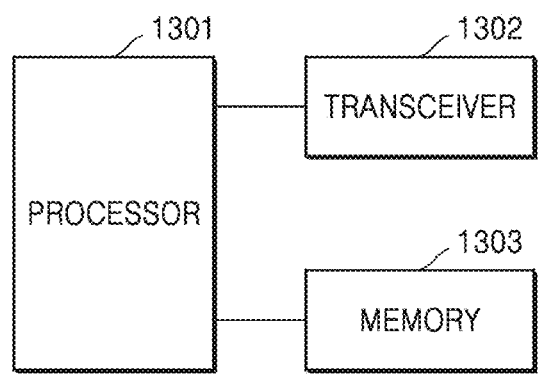
FIG. 13 is a block diagram illustrating an internal structure of a base station according to an embodiment.

FIG. 13 is a block diagram illustrating a structure of a base station according to an embodiment.

Referring to FIG. 13, the base station may include a processor 1301, a transceiver 1302, and a memory 1303. However, elements of the base station are not limited thereto. For example, the base station may include elements more or fewer than those illustrated in FIG. 13. In addition, the processor 1301, the transceiver 1302, and the memory 1303 may be implemented as one chip.

The transceiver 1302 may transmit/receive a signal to/from a terminal. The signal may include control information and data. To this end, the transceiver 1302 may include an RF transmitter that up-converts and amplifies a frequency of a transmitted signal and an RF receiver that performs low-noise amplification on a received signal and down-converts a frequency. The transceiver 1302 may receive a signal through a wireless channel, may output the signal to the processor 1301, and may transmit a signal output from the processor 1301 through the wireless channel.

The memory 1303 may store a program and data necessary to operate the terminal. The memory 1303 may store control information or data included in a signal transmitted/received by the terminal. The memory 1303 may include a storage medium such as a ROM, a RAM, a hard disk, a CD-ROM, or a DVD, or a combination of storage media. The memory 1303 may include a plurality of memories. The memory 1303 may store a program for a POSS configuration method of the base station and a PDCCH monitoring control operation according to the POSS configuration method.

The processor 1301 may control a series of processes so that the base station operates according to the above embodiments. For example, the processor 1301 may differently control the POSS configuration method of the base station and the PDCCH monitoring control operation according to the POSS configuration method according to embodiments. The processor 1301 may include a plurality of processors, and may differently control the POSS configuration method of the base station and the PDCCH monitoring control operation according to the POSS configuration method according to embodiments of the disclosure, by executing the program stored in the memory 1303.

The methods according to embodiments described herein may be implemented in the form of hardware, software, or a combination of hardware and software.

When the methods are implemented by software, a computer-readable storage medium or a computer program product, which stores one or more programs (software modules), may be provided. One or more programs stored in the computer-readable storage medium or the computer program product are configured to be executable by one or more processors in an electronic device. One or more programs include instructions causing the electronic device to perform the methods according to the claims or embodiments of the disclosure described herein.

These programs (software modules or software) may be stored in a random access memory (RAM), a non-volatile memory including a flash memory, read only memory (ROM), electrically erasable programmable read only memory (EEPROM), a magnetic disc storage device, a CD-ROM, a digital versatile disc (DVD), another optical storage device, or a magnetic cassette. Alternatively, these programs may be stored in a memory configured by combining some or all of them. In addition, each constituent memory may be provided in a multiple number.

The programs may be stored in an attachable storage device that is accessible via a communication network, such as the Internet, an intranet, a local area network (LAN), a wide LAN (WLAN), or a storage area network (SAN), or a combination thereof. Such a storage device may connect to a device for performing the embodiments of the disclosure via an external port. In addition, a separate storage device on a communication network may connect to a device for performing the embodiments.

It will be understood that each block and combinations of blocks in the flowchart illustrations may be implemented by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s). Because these computer program instructions may also be stored in a computer usable or computer-readable memory that may direct a computer or other programmable data processing apparatus to function in a particular manner, the instructions stored in the computer usable or computer-readable memory may produce an article of manufacture including instruction means that implement the functions specified in the flowchart block(s). Because the computer program instructions may also be loaded onto a computer or other programmable data processing apparatus, a series of operational steps may be performed on the computer or other programmable apparatus to produce a computer implemented process, and thus the instructions executed on the computer or other programmable apparatus may provide steps for implementing the functions specified in the flowchart block(s).

In addition, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may be executed in reverse order, depending upon the functionality involved.

Embodiments of the disclosure provide an apparatus and method for effectively providing a service in a mobile communication system.

The disclosure may, however, be embodied in different forms and should not be construed as limited to embodiments set forth herein; rather, these embodiments of the disclosure are provided so that this disclosure is thorough and complete. That is, it will be obvious to one of ordinary skill in the art that various modifications may be made based on the technical scope of the disclosure. Parts of an embodiment and another embodiment may be combined with each other to enable a base station and a terminal to operate. Embodiments may be applied to other communication systems, and other modifications based on the technical scope of the embodiments of the disclosure may be made. For example, embodiments of the disclosure may also be applied to an LTE system, a 5G or a new radio (NR) system.

While the disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method performed by a terminal in a wireless communication system, the method comprising:
    receiving, from a base station, at least one parameter for a search space to monitor downlink control information (DCI) related with power saving;
    receiving the DCI related with the power saving, on a common search space identified based on the at least one parameter, by a radio network temporary identifier (RNTI) for the power saving,
    identifying a wake up indicator included in the received DCI related with the power saving; and
    performing a physical downlink control channel (PDCCH) monitoring based on a value of the wake up indicator.

2. The method of claim 1, further comprising identifying an offset indicating a time when the terminal starts monitoring the PDCCH for reception of the DCI related with the power saving.

3. The method of claim 1,
    wherein a cyclic redundancy check (CRC) of the DCI related with the power saving is scrambled by a radio network temporary identifier (RNTI) for the power saving.

4. The method of claim 1,
    wherein an indication for an active downlink bandwidth part is further included in the DCI related with the power saving.

5. The method of claim 1,
    wherein the PDCCH monitoring is performed on a configured period.

6. A method performed by a base station in a wireless communication system, the method comprising:
    transmitting, to a terminal, at least one parameter for a search space to monitor downlink control information (DCI) related with power saving; and
    transmitting the DCI related with the power saving, on a common search space identified based on the at least one parameter, by a radio network temporary identifier (RNTI) for the power saving,
    wherein a wake up indicator included in the DCI related with the power saving is identified at the terminal, and
    wherein a physical downlink control channel (PDCCH) monitoring is performed at the terminal based on a value of the wake up indicator.

7. The method of claim 6,
    wherein an offset indicating a time when monitoring the PDCCH at the terminal for reception of the DCI related with the power saving is started is identified.

8. The method of claim 6,
    wherein a cyclic redundancy check (CRC) of the DCI related with the power saving is scrambled by a radio network temporary identifier (RNTI) for the power saving.

9. The method of claim 6,
    wherein an indication for an active downlink bandwidth part is further included in the DCI related with the power saving.

10. The method of claim 6,
    wherein the PDCCH monitoring is performed on a configured period.

11. A terminal in a wireless communication system, the terminal comprising:
    a transceiver; and
    a processor coupled with the transceiver and configured to:
        receive, from a base station, at least one parameter for a search space to monitor downlink control information (DCI) related with power saving,
        receive the DCI related with the power saving, on a common search space identified based on the at least one parameter, by a radio network temporary identifier (RNTI) for the power saving,
        identify a wake up indicator included in the received DCI related with the power saving, and
        perform a physical downlink control channel (PDCCH) monitoring based on a value of the wake up indicator.

12. The terminal of claim 11,
    wherein the processor is further configured to identify an offset indicating a time when the terminal starts monitoring the PDCCH for reception of the DCI related with the power saving.

13. The terminal of claim 11,
    wherein a cyclic redundancy check (CRC) of the DCI related with the power saving is scrambled by a radio network temporary identifier (RNTI) for the power saving.

14. The terminal of claim 11,
    wherein an indication for an active downlink bandwidth part is further included in the DCI related with the power saving.

15. The terminal of claim 11,
    wherein the PDCCH monitoring is performed on a configured period.

16. A base station in a wireless communication system, the base station comprising:
    a transceiver; and
    a processor coupled with the transceiver and configured to:
        transmit, to a terminal, at least one parameter for a search space to monitor downlink control information (DCI) related with power saving, and
        transmit the DCI related with the power saving, on a common search space identified based on the at least one parameter, by a radio network temporary identifier (RNTI) for the power saving,
        wherein a wake up indicator included in the DCI related with the power saving is identified at the terminal, and
        wherein a physical downlink control channel (PDCCH) monitoring is performed at the terminal based on a value of the wake up indicator.

17. The base station of claim 16,
    wherein an offset indicating a time when monitoring the PDCCH at the terminal for reception of the DCI related with the power saving is started is identified.

18. The base station of claim 16,
wherein a cyclic redundancy check (CRC) of the DCI related with the power saving is scrambled by a radio network temporary identifier (RNTI) for the power saving.

19. The base station of claim 16,
wherein an indication for an active downlink bandwidth part is further included in the DCI related with the power saving.

20. The base station of claim 16,
wherein the PDCCH monitoring is performed on a configured period.

* * * * *